(12) United States Patent
Smiljanic

(10) Patent No.: US 9,146,834 B2
(45) Date of Patent: Sep. 29, 2015

(54) TARGETED CLOUD-BASED DEBUGGING

(71) Applicant: Oracle International Corporation, Redwood Shores, CA (US)

(72) Inventor: John Smiljanic, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/267,361

(22) Filed: May 1, 2014

(65) Prior Publication Data

US 2015/0058824 A1  Feb. 26, 2015

Related U.S. Application Data

(60) Provisional application No. 61/868,763, filed on Aug. 22, 2013.

(51) Int. Cl.
*G06F 9/44* (2006.01)
*G06F 11/36* (2006.01)

(52) U.S. Cl.
CPC ........ *G06F 11/3636* (2013.01); *G06F 11/3664* (2013.01)

(58) Field of Classification Search
CPC .............. G06F 11/362; G06F 11/3636; G06F 11/3664; G06F 11/3668
USPC ................................ 717/123–130, 140–141
See application file for complete search history.

(56) References Cited

U.S. PATENT DOCUMENTS

| | | | |
|---|---|---|---|
| 5,121,498 A * | 6/1992 | Gilbert et al. ................. | 717/149 |
| 5,339,428 A * | 8/1994 | Burmeister et al. .......... | 717/146 |
| 6,148,402 A | 11/2000 | Campbell | |
| 6,282,702 B1 | 8/2001 | Ungar | |
| 6,516,416 B2 | 2/2003 | Gregg et al. | |
| 6,681,384 B1 * | 1/2004 | Bates et al. ................... | 717/129 |
| 6,915,509 B1 * | 7/2005 | Chkodrov et al. ............ | 717/124 |
| 6,966,057 B2 | 11/2005 | Lueh | |
| 7,020,852 B2 * | 3/2006 | Oeltjen et al. ................ | 716/136 |
| 7,191,433 B2 * | 3/2007 | Narad et al. .................. | 717/140 |
| 7,225,429 B2 * | 5/2007 | Bates et al. ................... | 717/125 |
| 7,287,243 B2 | 10/2007 | Dollin et al. | |

(Continued)

FOREIGN PATENT DOCUMENTS

WO  2014070902  5/2014

OTHER PUBLICATIONS

Johnson et al, "Composable Multi-Level Debugging with Stackdb", ACM, pp. 213-225, 2014.*

(Continued)

*Primary Examiner* — Anil Khatri
(74) *Attorney, Agent, or Firm* — Kilpatrick Townsend & Stockton LLP

(57) ABSTRACT

Various arrangements for debugging code are presented. A computer system, such as a web server, may compile code into compiled code. The code may contain one or more subsections, include a first taskflow. A selection of the first taskflow may be received from a remote, developer computer system via a network. The selection of the first taskflow may indicate that the first taskflow is to be debugged. Execution of the first taskflow of the compiled code may occur by the computer system. While the computer system is executing the first taskflow of the compiled code, debugging functionality of the first taskflow may be provided to the developer computer system.

18 Claims, 8 Drawing Sheets

(56) References Cited

U.S. PATENT DOCUMENTS

| | | | |
|---|---|---|---|
| 7,290,288 B2 | 10/2007 | Gregg et al. | |
| 7,343,588 B2* | 3/2008 | Bates et al. | 717/125 |
| 7,577,942 B2* | 8/2009 | Bates et al. | 717/129 |
| 7,624,385 B2 | 11/2009 | Waddington et al. | |
| 7,685,570 B2* | 3/2010 | Draine et al. | 717/125 |
| 7,774,172 B1* | 8/2010 | Yunt et al. | 703/2 |
| 7,873,872 B1* | 1/2011 | Shillington et al. | 717/124 |
| 7,917,894 B2* | 3/2011 | Chen et al. | 717/124 |
| 8,104,021 B2* | 1/2012 | Erlingsson et al. | 717/126 |
| 8,250,548 B2* | 8/2012 | Kasahara et al. | 717/149 |
| 8,255,887 B2* | 8/2012 | Heil | 717/141 |
| 8,332,828 B2 | 12/2012 | Vargas | |
| 8,392,885 B2* | 3/2013 | Stall et al. | 717/124 |
| 8,418,135 B2 | 4/2013 | Proctor et al. | |
| 8,601,453 B2 | 12/2013 | Gennard et al. | |
| 8,627,303 B2 | 1/2014 | Adams, III et al. | |
| 8,677,141 B2 | 3/2014 | Erlingsson et al. | |
| 8,843,901 B2* | 9/2014 | Krajec et al. | 717/130 |
| 8,863,085 B1* | 10/2014 | Stahlberg | 717/124 |
| 8,869,121 B2* | 10/2014 | Vorbach et al. | 717/140 |
| 8,887,138 B2* | 11/2014 | Eker et al. | 717/125 |
| 2007/0055957 A1 | 3/2007 | Birenheide et al. | |
| 2007/0113218 A1 | 5/2007 | Nolan et al. | |
| 2011/0173597 A1 | 7/2011 | Cascaval et al. | |
| 2011/0239307 A1 | 9/2011 | Joffray et al. | |
| 2011/0313981 A1 | 12/2011 | Ben-Natan | |
| 2012/0331351 A1 | 12/2012 | Davis et al. | |
| 2013/0067441 A1 | 3/2013 | Lafreniere et al. | |
| 2013/0086424 A1 | 4/2013 | Smiljanic et al. | |
| 2013/0104103 A1 | 4/2013 | Thunemann et al. | |
| 2014/0123116 A1 | 5/2014 | Smiljanic et al. | |

OTHER PUBLICATIONS

Liang et al, "Debugging ObjectOriented Programs with Behavior Views", ACM, pp. 133-142, 2005.*

Mega et al, "Debugging Distributed Object Applications With the Eclipse Platform", ACM, pp. 42-46, 2004.*

Danghui et al, "Design of a Real-Time Bus Monitor and Debugger for Embedded Systems ", IEEE, 4665-4667, 2010.*

Al-Sharif et al, "An Agent-Oriented Source-Level Debugger on Top of a Monitoring Framework", IEEE, pp. 241-247, 2009.*

Liu et al, "A Petri Net-based Distributed Debugger", IEEE, pp. 639-646, 1990.*

International Search Report and Written Opinion from PCT/US2014/048100 mailed on Oct. 8, 2014, 10 pages.

Unknown "Oracle Fusion Middleware Fusion Developer's Guide for Oracle Application Development Framework," retrieved on Sep. 30, 2014 from http://docs.oracle.com/cd/E25178_01/web.1111/b31974.pdf, 32 pages.

Camilo, et al. "Remote Debugging an EJB on WebLogic Server 10.0.1 with JDeveloper 10.1.3.3", retrieved on Dec. 12, 2013 from www.oracle.com/technetwork/developer-tools/jdev/remotedebuwls-086628.html , 6 pages.

U.S. Appl. No. 13/328,728, Non-Final Office Action mailed on Jul. 16, 2014, 19 pages.

U.S. Appl. No. 13/664,106, Final Office Action mailed on Jul. 16, 2014, 11 pages.

MacDonald, Groovy AST Transform to inject Spring Security Check for Java Caller, www.ohnoes-nz.blogspot.com, Retrieved from: http://ohnoes-nz.blogspot.com/2011 /09/this-post-follows-on-with trend-of. html, Sep. 12, 2011, 2 pages.

MacDonald, Groovy Logging Injection—AST Transformation, www.ohnoesnz.blogspot.com, Retrieved from: http://ohnoes-nz.blogspot.com/20 11 /09/groovy-logging-injection-ast. html, Sep. 16, 2011, 2 pages.

U.S. Appl. No. 13/664,106, Non Final Office Action mailed on Apr. 4, 2014, 10 pages.

Anonymous, "php-remote web server compilation?—Stack Overflow", retrieved from the Internet: <URL: http://stackoverflow.comjquestions/9859072/remote-web-server-compilation> [retrieved on Dec. 12, 2013], Mar. 25, 2012, 1 page.

Camilo Ruiz et al., Remote Debugging on Weblogic Server, retrieved from the Internet: <URL:http://www.oracle.com/technetwork/developer-tools/jdev/remotedebugwls-086628.html> [retrieved on Dec. 12, 2013], Jul. 1, 2008, pp. 1-6.

Champeau, Customizing Groovy Compilation Process, Cedric Champeau's Weblog, retrieved from the Internet: <http://jroller.com/melix/entry/customizing_groovy_compilation_process>, May 12, 2011, 5 pages.

Kolomvatsos et al., Debugging applications created by a Domain Specific Language: The IPAC case, The Journal of Systems and Software, vol. 85, No. 4, ISSN: 0164-1212, DOI: 10.1016/j.jss.2011.11.1009, Apr. 1, 2012, pp. 932-943.

International Patent Application No. PCT/US2013/067523, International Search Report and Written Opinion mailed on Jan. 13, 2014, 63 pages.

\* cited by examiner

TARGETED CLOUD-BASED DEBUGGING

CROSS-REFERENCE TO RELATED APPLICATIONS

This application claims priority from U.S. Provisional Pat. App. No. 61/868,763, entitled "Taskflow Targeted Debugging in the Cloud," filed on Aug. 22, 2013, the entire disclosure of which is hereby incorporated by reference for all purposes.

BACKGROUND

Typically, when a software developer is writing code, the developer will compile and execute the code in a debugging mode. A debugging mode may allow the developer a view into how the code is functioning during execution. When code is executed in a debugging mode, the developer can typically: view variable values during execution, set breakpoints at which execution of the code will halt until the developer triggers continued execution, and/or step through execution of the code on a line-by-line basis.

Such an arrangement may work well when the code is being compiled, debugged, and/or executed at a computer system local to the developer. In conventional arrangements, a choice between execution of code either entirely in a debugging mode (that permits debugging functionality) or a runtime mode (that conventionally does not permit debugging functionality) may need to be made. Such a choice may be easily made by the developer when he is the only person using the computer system.

Further, when a developer has code that is desired to be debugged, the developer may only be interested in debugging a portion of the code, while allowing the remainder of the code to execute without debugging functionality. Debugging functionality provided for the entire piece of code may serve to distract the developer and/or waste his time. Therefore, for these and other reasons, it may be desired that the developer can specify one or more portions of a code package for debugging to the exclusion of other portions.

SUMMARY

In some embodiments, a method for debugging code is presented. The method may include compiling, by a computer system, code into compiled code, wherein a first portion of the code corresponds to a first taskflow and a second portion of the code corresponds to a second taskflow. The method may include receiving, by the computer system, a selection of the first taskflow from a developer computer system via a network, wherein the selection indicates the first taskflow is to be debugged. The method may include commencing execution, by the computer system, of the first taskflow. The method may include, while the computer system is executing the first taskflow of the compiled code, providing, by the computer system, to the developer computer system via the network, debugging functionality for the first portion of the code.

Embodiments of such a method may include one or more of the following features: The method may include, prior to compiling the code, receiving, by the computer system, the code for compiling from the developer computer system via a web browser interface and the network, wherein the computer system is a web service computer system that provides compiling services for multiple developer computer systems. The method may include executing, by the computer system, the second taskflow. Selection for debugging of the second taskflow from the developer computer system via the network may not be received. Debugging functionality associated with the second portion of the code may not be provided to the developer computer system. The method may include providing, by the computer system, an interface, via a web browser, to the developer computer system, that permits selection among a plurality of taskflows, the plurality of taskflows comprising the first taskflow and the second taskflow. The method may include receiving, by the computer system, from the developer computer system, during execution of the first taskflow, a selection of the second taskflow. The method may include commencing execution, by the computer system, of the second taskflow. The method may include, while the computer system is executing the second taskflow of the compiled code, providing, by the computer system, to the developer computer system via the network, debugging functionality for the second portion of the code. Execution, by the computer system, of the first taskflow may be performed by a virtual machine executed by the computer system, the virtual machine executing the compiled code as a runtime thread. The method may include, while executing the first taskflow, executing, by the virtual machine executed by the computer system, a second runtime thread, wherein the second runtime thread does not have debugging functionality provided to any user. Compiling the code into the compiled code may include modifying the first portion of the code and the second portion of the code during compilation to include additional code, wherein the additional code provides for debugging functionality. The debugging functionality may include one or more features selected from the group consisting of: halting execution of the first taskflow at a breakpoint within the first portion of the code at the developer computer system, outputting a variable value from within the first portion of the code to the developer computer system during execution of the first taskflow, and receiving input from the developer computer system that triggers processing of individual expressions in the first portion of the code to occur.

In some embodiments, a system for debugging code is presented. The system may include a web service computer system, comprising one or more processors; and a memory communicatively coupled with and readable by the one or more processors and having stored therein processor-readable instructions. The instructions, when executed by the one or more processors, cause the one or more processors to compile code into compiled code, wherein a first portion of the code corresponds to a first taskflow and a second portion of the code corresponds to a second taskflow. The instructions may cause the one or more processors to receive a selection of the first taskflow from a developer computer system via a network, wherein the selection indicates the first taskflow is to be debugged. The instructions may cause the one or more processors to commence execution of the first taskflow. The instructions may cause the one or more processors to, while the web service computer system is executing the first taskflow of the compiled code, provide, to the developer computer system via the network, debugging functionality for the first portion of the code.

Embodiments of such a system may include one or more of the following features: The instructions may cause the one or more processors to, prior to compiling the code, receive the code for compiling from the developer computer system via a web browser interface and the network. The instructions may cause the one or more processors to execute the second taskflow. Selection for debugging of the second taskflow from the developer computer system via the network may not be received. Debugging functionality associated with the second portion of the code may not be provided to the developer computer system. The instructions may cause the one or more processors to provide, an interface, via a web browser, to the developer computer system, that permits selection among a plurality of taskflows, the plurality of taskflows comprising the first taskflow and the second taskflow. The instructions may cause the one or more processors to receive, from the developer computer system, during execution of the first taskflow, a selection of the second taskflow. The instructions may cause the one or more processors to commence execution of the second taskflow. The instructions may cause the one or more processors to, while the computer system is executing the second taskflow of the compiled code, provide, to the developer computer system via the network, debugging functionality for the second portion of the code. Execution of the first taskflow may be performed by a virtual machine executed by the computer system, the virtual machine executing the compiled code as a runtime thread. The instructions may cause the one or more processors to, while executing the first taskflow, execute, by the virtual machine, a second runtime thread, wherein the second runtime thread does not have debugging functionality provided to any user. The processor-readable instructions that, when executed, cause the one or more processors to compile the code into the compiled code may include processor-readable instructions which, when executed, cause the one or more processors to modify the first portion of the code and the second portion of the code during compilation to include additional code, wherein the additional code provides for debugging functionality. The debugging functionality comprises one or more features selected from the group consisting of: halting execution of the first taskflow at a breakpoint within the first portion of the code at the developer computer system, outputting a variable value from within the first portion of the code to the developer computer system during execution of the first taskflow, and receiving input from the developer computer system that triggers processing of individual expressions in the first portion of the code to occur.

In some embodiments, a non-transitory processor-readable medium for debugging code is presented. The instructions may be configured to cause the one or more processors to compile code into compiled code, wherein a first portion of the code corresponds to a first taskflow and a second portion of the code corresponds to a second taskflow. The instructions may be configured to cause the one or more processors to receive a selection of the first taskflow from a developer computer system via a network, wherein the selection indicates the first taskflow is to be debugged. The instructions may be configured to cause the one or more processors to commence execution of the first taskflow. The instructions may be configured to cause the one or more processors to, while executing the first taskflow of the compiled code, provide, to the developer computer system via the network, debugging functionality for the first portion of the code. In some embodiments, the instructions may be configured to cause the one or more processors to, prior to compiling the code, receive the code for compiling from the developer computer system via a web browser interface and the network, wherein the computer system is a web service computer system that provides compiling services for multiple developer computer systems.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
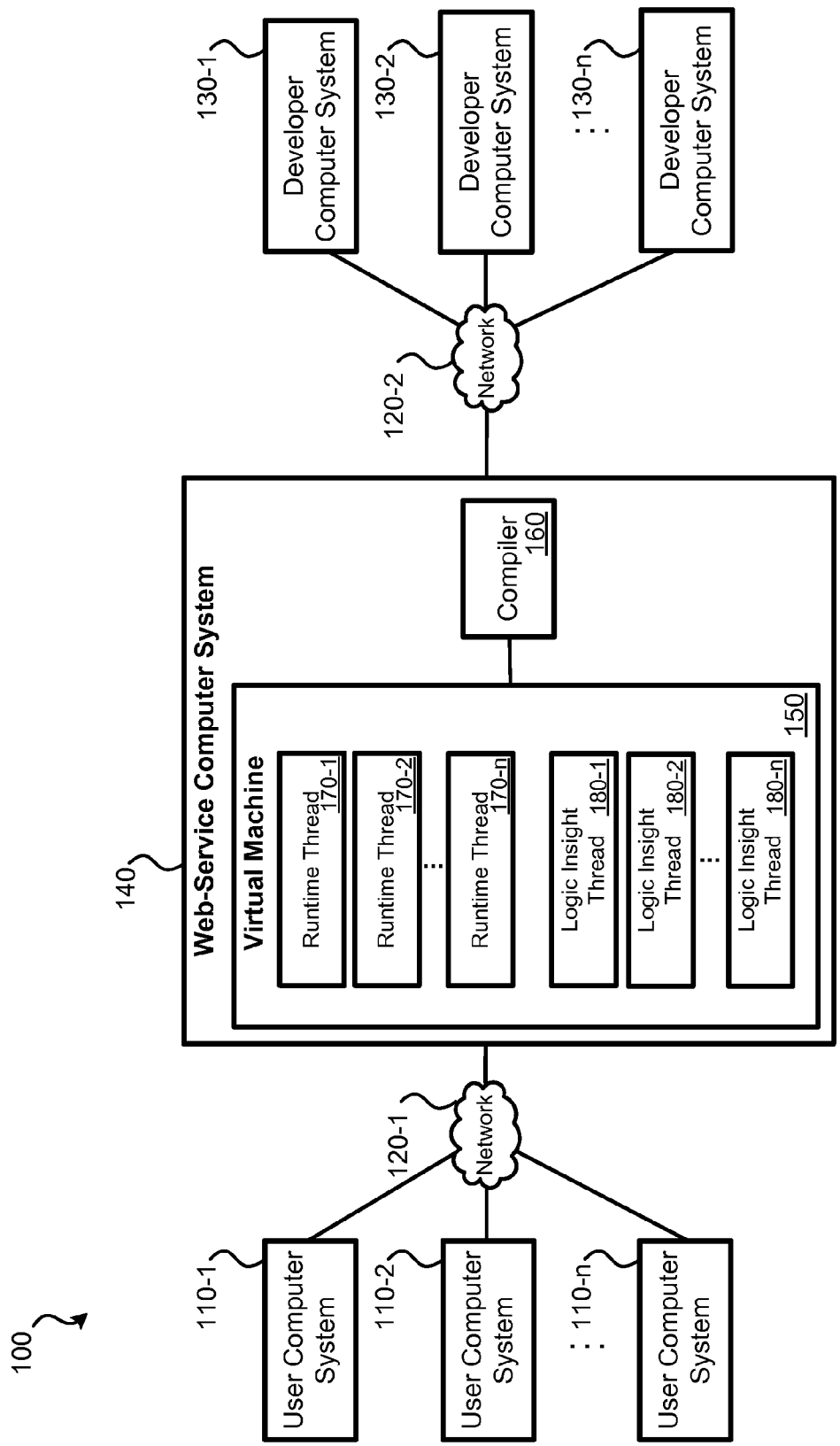
FIG. 1 illustrates an embodiment of a system configured to execute one or more runtime threads and one or more logic insight threads simultaneously.

A computer system that provides a web service (e.g., a web server) may be used to compile and execute code, such as business logic code, for one or more users at the same time. Such arrangements may have significant advantages for the users—since the local devices being used by the users are not performing the compilation or execution of the code, less processing ability may be used and/or need at the local devices. The code compiled and executed by the web service may be referred to as injected code. Such injected code is provided for compilation and/or execution from a remote computer system. A developer writing or editing code may use a local computer system to view and edit the code, but may transfer the code to the web service for compilation and execution.

Some users, who may be accessing the web service via a network connection from a remote computing device, may have a runtime thread being executed by the web service computer system. Such a runtime thread may be compiled injected code, such as compiled business logic code, that is being executed without debugging functionality. As such, a runtime thread being executed by the web service computer system may not contain or enforce breakpoints, may not stop and wait for input to proceed with executing each expression in the code, and may not output values of various variables present within the injected code. Different users of the web service may be associated with different runtime threads. Runtime threads being executed for different users may correspond to the same or different pieces of compiled code (for example, a particular compiled piece of code may be executed as multiple threads for multiple users). As such, a user accessing the web service via a network (e.g., the Internet) may have the web service executing a runtime thread while another user accessing the web service via a network may have the web service executing a second runtime thread that is unrelated to the first runtime thread.

Each of these runtime threads may be executed by the same virtual machine of the web service computer system. Such a virtual machine may be configured to run exclusively in a particular mode. For instance, this virtual machine may be configured to run in either a debugging mode or a runtime mode. These modes may be exclusive; all threads being executed by the virtual machine may need to be executed in the debugging mode or all threads being executed by the virtual machine may need to be executed in runtime mode.

If a particular user (e.g., a business logic developer) desires to debug code, such as business logic code the developer has written or modified, a debugging mode may be desired by the developer. Debugging may allow the developer to do one or more of the following debugging activities: set breakpoints in the injected code at which point execution of the business logic pauses until the developer indicates execution is to continue; step through execution of the injected code on an expression-by-expression basis; and view and/or edit the values of variables during execution of the compiled injected code.

Further, it should be understood that the code being debugged by the developer may be complex, having one or more subsections. While the developer may desire to debug a portion of the injected code, the developer may desire for another portion of the injected code to execute without debugging functionality. Such an arrangement may permit for the developer to target his debugging to a specific portion of the injected code while allowing the remainder of the injected code to execute without the developer being provided the debugging functionality.

If the virtual machine is run in debugging mode to allow one or more developers to debug code, the execution of the injected code for other users on the webserver may be affected and forced to also run in a debugging mode. As such, having the same virtual machine execute one or more threads of which some are being debugged concurrently while one or more other threads are run in a runtime mode (without debugging functionality) may be desired to allow all users accessing the webserver to have code executed in the desired mode.

To allow one or more developers to debug injected code while other threads are concurrently being executed in runtime mode without debugging functionality by the web service, the virtual machine of the web service may be run exclusively in a runtime mode. When the injected code that is desired to be debugged is compiled, the compiler may edit the injected code being compiled to include debugging functionality. Once compiled, the bytecode created from the injected code may be executed by the virtual machine as a runtime. As such, from the point-of-view of the virtual machine of the web service, the thread based on the compiled injected code is executed as a runtime; however, from the point-of-view of the developer, the thread has the same or similar debugging functionality as compared to if the virtual machine was in a debugging mode. The debugging functionality allows the injected code to be debugged, because such debugging functionality was added into the injected code during the compiling process.

While the developer may desire to debug certain portions of injected code, the developer may desire for other portions of the injected code to execute without debugging functionality being provided to the developer. Having debugging functionality enabled for portions of the injected code not desired to be debugged may serve to distract, delay, and/or otherwise negatively affect the developer's ability to debug the one or more portions of the code that the developer desires to debug.

Injected code may be called by various taskflows. A "taskflow" may define one or more sections or pieces of code that is a series of requests and/or portions of code related to a common function. A taskflow defines a set of activities that are executed in a sequence together to perform a particular functional task in the application. Activities may be defined to perform some subset of the overall application code like displaying a new page, entering application data, or saving application data. In a web application compiled from code, the activities of a particular taskflow may be invoked by requests that originate from a user's browser. A taskfow can invoke a specific piece or portion of injected code. Taskflows can invoke injected code and may also invoke static code. Static code can refer to code that is not injected and/or cannot be edited by the developer. Such static code may be provided by the original application developer and/or providers of other services that the application may invoke. A taskflow may be predefined (that is, cannot be edited by the developer) or may be permitted to be created and/or modified by a developer. A taskflow may include one or more predefined "hook" points that permit injected code to be called. Therefore, a taskflow may involve the execution of one or more pieces of static code and may optionally allow for one or more pieces of injected code to be executed.

Overall, the code that is executed by an Oracle® ERP application developer may significantly depend upon code that was provided by Oracle®. Along with the static code, the taskflow may call one or more pieces of injected code that allow for modifying and/or customizing the functionality of the static code. Such static code may be deployed with the webserver, rather than being injected by the developer. Therefore, while a developer may provide the injected code that is to be compiled, the static code may already be stored or otherwise accessible by the webserver. Static code may executed as part of the same runtime thread that is executing injected code. Therefore, a particular runtime thread may execute runtimes associated with static code and injected code.

Taskflows can provide a modular approach for defining control flow in an application (e.g., constructed from injected code and/or static code). Therefore, an application may call multiple different taskflows to accomplish various tasks. Instead of representing an application as a single, large page flow, the application can be broken into a collection of reusable taskflows. Each taskflow may contain a portion of the application's navigational graph. As an example, an airline system may include a create/edit reservation taskflow that calls the injected and static code necessary to edit airline reservations, a frequent flyer taskflow may call the injected and static code necessary to create and/or use a frequent flyer account. As another example, a manage account taskflow could contain code to manage an account holder's address, birth date, password, etc. It should be understood that different taskflows may call the same piece of injected code in different contexts. Therefore, a piece of injected code may be called by multiple taskflows. As an example, in the airline system example, a same piece of injected code may be used for determining which seats are available on a plane as is used to determine the total number of available seats on the plane.

Compiling injected code that is desired to be debugged may involve expressions present within the code received from the developer being modified and/or additional expressions being added. Such additions and/or modifications may result in the compiled code: pausing after the execution of each expression (until the developer provides approval for execution of the next expression); outputting an indication that an expression has begun processing; outputting an indication that an expression has finished processing; outputting indications of the values of variables present within the code; and/or permitting the value of variables to be set prior to execution of one or more expressions. Each of these additions and/or modifications to the injected code may result in the developer being able to debug the code as the code is being executed (e.g., in real time) as a runtime.

The developer may be permitted to select or otherwise indicate one or more taskflows for debugging, such that injected code associated with the selected taskflows can be debugged. By indicating a taskflow instance for debugging, the developer is indicating that the developer desires debugging functionality for one or more portions of the injected code associated with the indicated taskflow, but does not desire debugging functionality for one or more portions of the injected code not associated with the indicated taskflow instance. (Further, debugging for static code may not be available, regardless of whether the associated taskflow is selected for debugging.) In some embodiments, the developer can select multiple taskflows for debugging. By debugging a taskflow instance of a taskflow, the developer can debug the taskflow while other instances of the taskflow may be executed without debugging functionality. If a piece of injected code is called by multiple taskflows, debugging functionality for the injected code may only be available in the one or more taskflows selected for debugging, but not when the one or more taskflows not selected for debugging are being executed.

The virtual machine may be executing a thread of compiled injected code (which was called by a taskflow) being debugged in runtime mode concurrently with other threads corresponding to other (possibly injected) code that is not being debugged that is being executed as a runtime for other users. To the developer performing the debugging, the modification and/or addition of expressions in the developer's code provides the developer with debugging functionality without the virtual machine executing in a debugging mode. Debugging functionality may only be provided to the developer for the specific taskflows for which the developer indicated that debugging was desired. Therefore, the developer's injected code would only have debugging functionality during the execution of the indicated taskflow in which the developer's injected code was called. The same piece of injected code or other pieces of injected code, at least from the point-of-view of the developer, may appear to be executed as a runtime without debugging functionality when executed as part of a taskflow for which debugging functionality was not requested. For such portions of the code in which debugging functionality is not desired, the portions of code may not have functionality activated that allows for: pausing after the execution of each expression; outputting an indication that an expression has begun processing; outputting an indication that an expression has finished processing; outputting indications of the values of variables present within the injected code; and/or editing or setting the values of variables present within the injected code. In some embodiments, modifications and/or additional expressions may still be added to the portions of code associated with taskflows that the developer does not desire to debug; however the web service computer system executing the injected code may ignore such debugging expressions and continue executing the code until the portion of the injected code is reached that is associated with the taskflow that the developer does desire to debug. For this portion of the code, the debugging expressions may not be ignored and may be used to provide debugging functionality to the developer while the code is executed as a logic insight thread.

The following systems and methods provide detail as to how a multi-user system, such as a cloud-based web service computer system, can be used to simultaneously execute threads in a runtime mode for one or more users while one or more developers are executing threads for debugging. Further, the following details how a developer can isolate injected code within one or more taskflows for debugging while permitting the remainder of the injected code to execute as a runtime.

The principles described herein may be applicable to various forms of code written in various programming languages. As detailed herein, examples are focused on what is referred to as business logic code. Business logic code may be written in a programming language, such as Java® and Groovy®, and may apply to a particular "business domain." For instance, expressions may permit for functions to be performed that are specific to accounting or insurance. Business logic may be thought of as allowing for higher-level programming than some common programming languages, such as Java® by itself. It should be understood that similar principles as detailed herein may be applied to other programming languages and non-business logic arrangements.

Various terms are used throughout this document. For clarity, these terms are defined as follows:

"Injected code" refers to code that is provided ("injected") from a first computer system for compilation and/or execution by a second computer system. The first computer system can be remotely located from the second computer system and may communicate with each other via a network. For example, in some embodiments, a developer computer system is used to write and/or edit code and the code is injected as injected code to a web service computer system that performs the compilation and/or execution of the injected code. Injected code can be compiled and executed without debugging functionality or to include debugging functionality.

An "injected code runtime" refers to compiled code based at least in part on injected code that is executed by a virtual machine in a runtime mode. The virtual machine does not provide debugging functionality for an injected code runtime.

A "runtime thread" refers to a thread that is executing an injected code runtime. A runtime thread does not provide debugging functionality. An injected-code runtime thread is executed by the virtual machine in a runtime mode. Multiple runtime threads of a same injected-code runtime may be executed by a web service computer system at the same time. A runtime thread may additionally execute one or more runtimes based on static code.

"Logic insight injected code runtime" refers to compiled code (which may be based on business logic code) that is executed by a virtual machine in a runtime mode and provides debugging functionality. Logic insight injected code is compiled, at least in part, from injected code received from a developer (who may or may not be the same developer who desires the debugging functionality).

A "logic insight thread" refers to a thread that is executing a logic insight injected code runtime. A logic insight thread provides debugging functionality to a developer. A logic insight thread is executed by the virtual machine of a web service computer system in a runtime mode. A logic insight thread may additionally execute one or more runtimes based on static code.

FIG. 1 illustrates an embodiment of a system 100 configured for executing runtime threads and logic insight threads simultaneously for multiple users. System 100 may be further configured such that a developer can specify one or more particular taskflows for debugging, such that the developer is not presented with debugging functionality for other portions of code associated with a taskflow not desired to be debugged. System 100 may include: user computer systems 110, networks 120, developer computer systems 130, and web service computer system 140. Web service computer system 140 may include: virtual machine 150, compiler 160, runtime threads 170, and logic insight threads 180.

Both runtime threads 170 and logic insight threads 180 may refer to one or more taskflows that are used to determine which compiled pieces of code are to be executed. Different runtime threads 170 and/or different logic insight threads 180 may refer to different taskflows. Such taskflows may be stored by the web service computer system 140, are accessible by the web service computer system 140, and/or are provided by a developer in a similar fashion to injected code.

Each user computer system 110 may be operated by a user that is associated with a runtime thread of runtime threads 170 being executed by virtual machine 150 of web service computer system 140. Users of user computer systems 110 may desire and have specified that the runtime threads 170 were to be compiled and/or executed without debugging functionality. Accordingly, execution of each of runtime threads 170 for user computer systems 110 may not involve debugging functionality being provided to the users, including: breakpoints, output of variable values from within the business logic code to user computer systems 110, or input being required from user computer systems 110 for processing of expressions within runtime threads 170 to occur. User computer systems 110 may be unaffiliated with each other. For example, each user computer system 110 may be operated by a different user than is accessing web service computer system 140 via the Internet. Alternatively, some or all of user computer systems 110 may be operated by users of a particular organization, such as a particular business organization. The runtime threads that are or executed by web service computer system 140 may be based off of the same or different runtime threads. Runtime threads 170 may be based on injected-code runtimes that were compiled (by the web service computer system) based on (business) code provided to web service computer system 140 via user computer systems 110 or by some other computer system (such as a developer computer system of developer computer system 130). In FIG. 1, three user computer systems are illustrated—this is for illustration purposes only. Fewer or additional user computer systems 110 may be associated with runtime threads being executed by virtual machine 150 of web service computer system 140. While web service computer system 140 is referred to as a "web service" computer system, it should be understood that the compilation and execution services may be provided over various forms of networks, including the Internet and the private intranets.

User computer systems 110 may interact with web service computer system 140 via a web-based interface. For example, a web-based interface may be provided to user computer systems 110 by web service computer system 140 that permits code to be injected to the web service computer system 140 for compilation. The web-based interface, which may be presented on user computer systems 110 via a web browser, may allow a user of user computer systems 110 to interact with the runtime thread being executed based on the injected-code runtime created from injected code. To be clear, a "web-based" interface may operate via a browser and allow data to be exchanged across various forms of networks, including the Internet and private intranets.

It should be understood that web service computer system 140 may be operated by a third-party. For instance, a corporate entity may operate web service computer system 140 to provide compilation, debugging, and/or execution services to one or more other entities (of which the users of user computer systems 110 may be members). Alternatively, web service computer system 140 may be operated by an entity that is providing compilation, debugging, and/or execution services for its agents (e.g., employees).

Network 120-1 may represent one or more public networks and/or one or more private networks. A public network may be the Internet, and a private network may be an intranet, such as a corporate local area network. Each of user computer systems 110 may communicate with web service computer system 140 via network 120-1. The runtime threads 170 being executed on behalf of user computer systems 110 may involve information being exchanged between user computer systems 110 and web service computer system 140 via network 120-1. User computer system 110-1, on whose behalf runtime thread 170-1 is being executed by web service computer system 140, may involve HTTP requests and/or other forms of information exchange occurring via network 120-1.

Network 120-2 may also represent one or more public networks and/or one or more private networks. The public network may be the Internet and the private network may be an intranet, such as a corporate local area network. Network 120-2 may represent the same network(s) or different network(s) from network 120-1. Each of developer computer systems 130 may communicate with web service computer system 140 via network 120-2. The logic insight thread 180-1 being executed on behalf of developer computer system 130-1 may involve information being exchanged between developer computer system 130-1 and web service computer system 140 via network 120-2. Such information may involve HTTP requests and/or other forms of information exchange occurring via network 120-2.

Each developer computer system of developer computer systems 130 may be operated by a developer that is coding, editing, modifying, debugging, and/or otherwise testing the execution of code, such as business logic code. Developers operating developer computer systems 130 may desire for some or all of the business logic being coded by the developers to execute with debugging functionality. As such, runtime functionality is not desired by the developer for the entire piece of business logic code. In FIG. 1, logic insight threads 180 are illustrated as being executed by virtual machine 150. Virtual machine 150 is the same virtual machine that is also executing runtime threads for one or more users. Logic insight threads 180 may be based on one or more pieces of injected code compiled as logic insight injected code runtimes to include debugging functionality. Execution of logic insight threads 180 may involve the use of: breakpoints, outputting of variable values from the business logic code to a developer computer system of developer computer systems 130 during execution, or input being required from a developer computer system of developer computer systems 130 for processing of individual expressions in the business logic code of logic insight thread 180-1 to occur. Developer computer systems 130 may be unaffiliated with each other. For example, each developer computer system 130 may be operated by a different developer that is coding, compiling, and/or debugging business logic code on web service computer system 140 via the Internet. Alternatively, some or all of developer computer systems 130 may be operated by developers of a particular organization, such as a business organization. In FIG. 1, three developer computer systems 130 are illustrated—this is for illustration purposes only. Fewer or additional developer computer systems 130 may be associated with the writing, editing, modifying, and/or debugging of business logic code, such injected code being compiled and executed by virtual machine 150 of web service computer system 140 as a logic insight runtime thread.

Developer computer systems 130 may interact with web service computer system 140 via a web-based interface. For example, a web-based interface may be provided to developer computer systems 130 by web service computer system 140 that permits code to be injected to the web service computer system 140 for compilation. This web-based interface may allow for viewing and editing of the code and also for the developer to interact with debugging functionality provided by the web service computer system. The web-based interface, which may be presented on developer computer systems 130 via a web browser, may allow a developer using one of developer computer systems 130 to interact with the logic insight thread being executed based on the logic insight injected code runtime created from injected code (which may have been provided by the developer via the web-based interface.

Developer computer systems 130 and user computer systems 110 are illustrated in FIG. 1 as distinct. It should be understood this is for the purpose of differentiating between developers, who are coding, compiling, editing, and/or debugging injected code as logic insight injected code runtimes and users on whose behalf injected code is being executed as runtime threads. The hardware of developer computer systems 130 and user computer systems 110 may be similar or the same. If a developer indicates that injected code is to be compiled and executed as a runtime thread, the developer's developer computer system may be considered a user computer system. Similarly, if a user indicates that injected code is to be compiled and executed for debugging as a logic insight injected code runtime, the user's user computer system may be considered a developer computer system. Accordingly, the designation of a computer system as a developer computer system or user computer system varies based on whether injected code is compiled and executed as a runtime thread or as a logic insight thread for debugging by the developer.

Web service computer system 140 may include one or more computer systems. Web service computer system 140 may include one or more webservers that handle communication via one or more networks with user computer systems 110 and developer computer systems 130. These same webservers or separate computer systems may perform compilation and/or execution of injected code and threads. Web service computer system 140 may be used to compile and/or execute business logic code written by multiple developers. Such business logic code may be received from user computer systems 110 and developer computer systems 130. The business logic code compiled and executed by web service computer system 140 may be received via networks 120 from various users and developers. Compiler 160 may be used to compile injected code received from user computer systems 110 and developer computer systems 130. Injected code, once compiled, may be executed using virtual machine 150. In some embodiments, compiler 160 may be part of virtual machine 150. Injected code received by web service computer system 140, may be compiled into either an injected code runtime or a logic insight injected code runtime. Compilation occurs into an injected code runtime if debugging functionality is not desired by the user. Compilation occurs into a logic insight injected code runtime if debugging functionality is desired by the developer. Both injected-code runtimes and logic insight injected code runtimes may be executed by virtual machine 150 in a runtime mode. Therefore, from the point-of-view of virtual machine 150 of web service computer system 140, all code is executed as runtimes.

Virtual machine 150 may be executed by web service computer system 140. Virtual machine 150 may serve as a programming language interpreter. Virtual machine 150 may permit the same code to be executed by different underlying hardware (e.g., web service computer system 140). Virtual machine 150 may be used to execute runtime threads 170 and logic insight threads being executed by web service computer system 140. Virtual machine 150 may be permitted to function exclusively in either a debugging mode or a runtime mode at a given time. As such, all runtime threads and logic insight threads being executed by virtual machine 150 may be required to be executed by virtual machine 150 in the same mode to permit virtual machine 150 to function.

Multiple threads corresponding to the same injected-code runtime may be executed at the same time. By way of example, runtime thread 170-1 may be associated with user computer system 110-1; runtime thread 170-2 may be associated with user computer system 110-2; and runtime thread 170-*n* may be associated with user computer system 110-*n*. Each runtime thread of runtime threads 170 may be executed as runtime threads without debugging functionality. As such, runtime threads 170 may be executed without waiting for input to proceed from the user, and/or values of variables from within the code of the runtime threads 170 are not output for viewing or editing by the users of user computer systems 110. Runtime threads 170 may be based on the same injected-code runtime or different injected-code runtimes. As such, multiple different injected code runtimes may be executed by virtual machine 150 simultaneously as runtime threads. For runtime threads 170 to be executed as desired for user computer systems 110 (and the associated users) without debugging functionality, virtual machine 150 may be in a runtime mode and not in a debugging mode.

While three runtime threads are illustrated in FIG. 1 as being executed by virtual machine 150, it should be understood that fewer or greater numbers of runtime threads may be simultaneously executed by virtual machine 150 of web service computer system 140.

Logic insight threads 180 represent logic insight injected code runtimes being executed on which debugging is being performed by developers via developer computer systems, such as developer computer system 130-1. Logic insight threads 180 may have been compiled by compiler 160. At the time of compiling, the developer, via developer computer system 130-1, may have supplied injected code (such as via a web-based interface) and provided an indication to compiler 160 that debugging of the injected code supplied by the developer computer system 130-1 to compiler 160 is desired. One or more of the developers may have specified one or more taskflows within the business logic code that are desired to be debugged. Therefore, for injected code to be compiled, the web-based interface may provide a developer with the option to select (and deselect) various taskflows that the developer does (and does not) desire to have debugging functionality. Code called by the taskflows selected for debugging may be the only code provided with debugging functionality.

Compiler 160 may compile the injected code supplied by developer computer system 130-1 into a logic insight injected code runtime that is executed as logic insight thread 180-1. Based on the indication received from developer computer system 130-1 that debugging is desired, the supplied business logic code may be compiled into a logic insight injected code runtime rather than an injected-code runtime. The compiled logic insight injected code runtime may contain expressions that provide debugging functionality, but the compiled logic insight injected code is executed by the virtual machine in a runtime mode. Thus, the debugging functionality attributes of a logic insight injected code runtime may not require virtual machine 150 to be operated in a debugging mode. When being compiled, compiler 160 may modify and/or add expressions to the injected code received from developer computer system 130-1 to provide debugging functionality to the developer operating developer computer system 130-1. The debugging functionality may include: waiting for input from logic insight virtual machine (LIVM) 210 before each expression coded by the developer of logic insight thread 180-1 is executed, allowing breakpoints to be set within the business logic code coded by the developer or the business logic code to be executed expression-by-expression, and providing an indication of variable values from the expressions of the logic insight threads 180 to developer computer systems 130 for display to the developers.

If a developer has indicated that debugging functionality is desired for only a subset of the taskflows which invoke injected code, compiler 160 may modify and/or insert expressions that enable debugging functionality in all taskflows. When a taskflow of the logic insight injected code runtime is being executed in which debugging functionality is not desired by the user, the web service computer system 140 may simply not provide the developer with the debugging functionality. Such an arrangement may permit the developer, during execution of the logic insight injected code runtime, to modify his selection of for which taskflows debugging functionality is provided. If the developer has specified one or more particular taskflows to be debugged within the injected code, debugging functionality may be ignored by the web service computer system unless one of the taskflows selected for debugging by the developer is being executed. Static code may not have debugging functionality provided for the developer regardless of whether it is called as part of a taskflow selected for debugging.

Based on the additions and/or modifications to the business logic injected code made by compiler 160 during compilation, the logic insight injected code runtime created (as byte-code), provides debugger functionality to the developer. However, to the virtual machine, the logic insight injected code being executed as a logic insight thread is a runtime similar to runtime threads 170 that are executed in runtime mode. While logic insight injected code runtimes provide debugger functionality to developers, logic insight injected code runtimes may not run in a debugging mode by a virtual machine. Logic insight threads 180 and runtime threads 170 can be executed simultaneously; the virtual machine functions in runtime mode for all of these threads. Further, the execution of logic insight threads does not affect the execution of runtime threads 170 any differently than other runtime threads. Similarly, the execution of runtime threads does not affect the execution of logic insight threads any differently than the execution of additional logic insight threads would. In FIG. 1, three logic insight threads 180 are illustrated—this is for illustration purposes only. Fewer or additional logic insight threads may be executed by virtual machine 150.

If the developer of developer computer system 130-1 does not provide an indication that the injected business logic code supplied via developer computer system 130-1 is to be compiled for debugging, the business logic code may be compiled into an injected-code runtime rather than a logic insight injected code runtime. Compiler 160 may be configured to compile multiple pieces of injected code simultaneously for multiple users/developers. Compiler 160 may compile injected business logic code into injected code runtimes and/or logic insight injected code runtimes while virtual machine 150 is executing one or more runtime threads 170 and one or more logic insight threads 180. At a given time, it may be possible that virtual machine 150 is only executing either runtime threads 170 or logic insight threads 180.

Figure 2:
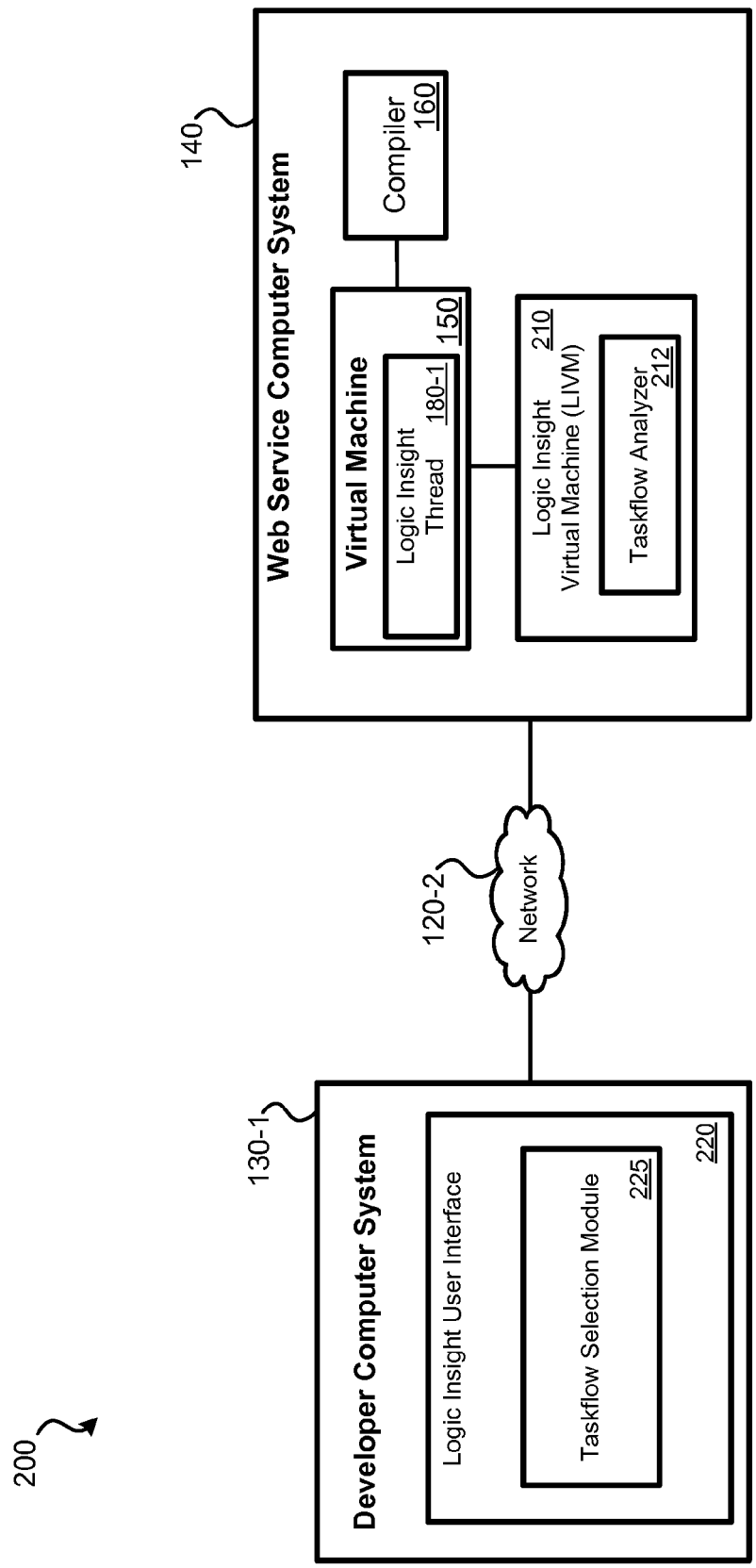
FIG. 2 illustrates an embodiment of a system configured to compile and execute logic insight injected code such that debugging functionality associated with only selected taskflows is made available to a developer.

FIG. 2 illustrates an embodiment of a system 200 configured to compile and execute logic insight injected code such that execution of only some taskflows within the logic insight injected code are made available for debugging to a developer. System 200 may represent an embodiment of web service computer system 140 interacting with a particular developer computer system 130-1. As such, at least in some embodiments, system 200 is part of system 100. System 200 may include: developer computer system 130-1, network 120-2, web service computer system 140, virtual machine 150, compiler 160, logic insight thread 180-1, and logic insight virtual machine 210. System 200 may additionally include logic insight user interface 220 presented by developer computer system 130-1.

Logic insight virtual machine (LIVM) 210 may be associated with a particular developer's session when debugging functionality is required by the developer. A "session" may refer to an instance of a web browser of a developer computer system or user being open with the web service computer system 140. Each HTTP session may be assigned an identifier such that information received by web service computer system 140 from developer computer system 130-1 may be applied to the appropriate data at web service computer system 140. After an HTTP session has been established, a session identifier may be sent with each response by developer computer system 130-1 to web service computer system 140.

As such, the HTTP session of developer computer system 130-1 with web service computer system 140 is linked with logic insight thread 180-1 and LIVM 210. LIVM 210 may serve as an intermediary between logic insight thread 180-1 and developer computer system 130-1. LIVM 210 may be executed by web service computer system 140, virtual machine 150 of web service computer system 140, by a remote computer system, or by the developer computer system 130-1. A separate LIVM 210 may be executed by web service computer system 140 for each session of various developer computer systems. When compiler 160 compiles the business logic code to create the logic insight injected code runtime (of which logic insight thread 180-1 is an executed instance), additional expressions may have been added and/or expressions may have been modified in the injected code such that input is required before each expression coded by the developer is executed. For instance, after each expression in logic insight thread 180-1 that corresponds to injected code, an input may be required to be received from LIVM 210 before the next expression of logic insight thread 180-1 executes. Expressions based on static code may process without input being required. LIVM 210 may serve to provide these inputs to logic insight thread 180. By logic insight thread 180-1 requiring input before each expression coded by the developer is executed, the developer is allowed to step through execution of the business logic code on an expression-by-expression basis, set breakpoints (and view the state of the code/variable at the breakpoints), and/or view and/or modify the values of variables within the injected code.

Breakpoints selected by the developer may serve to instruct LIVM 210 to permit continued execution of logic insight thread 180 until one of the breakpoints set by the developer is reached within a taskflow selected for debugging. As such, LIVM 210 may provide logic insight thread 180-1 input to permit each expression of the logic insight thread to be executed until a breakpoint is reached within code of a taskflow selected for debugging. At this point, input may be required from the developer to LIVM 210 which, in turn, transmits an instruction to virtual machine 150 for execution of logic insight thread 180-1 to continue. If a developer desires to execute the business logic code on an expression-by-expression basis, LIVM may wait until input is received from the developer after each expression executed before the next expression of the logic insight thread is executed within the taskflow selected for debugging. Execution of expressions outside a selected taskflow may be caused to be executed by the LIVM without developer interaction. Therefore, from the point-of-view of LIVM 210, input may be required to be provided to virtual machine 150 after each executed expression of logic insight thread 180-1 for execution to continue. Whether this input is provided by LIVM 210 to virtual machine 150 automatically or in response to developer input received via developer computer system 130-1 may be based on whether a breakpoint has been reached or the developer requested execution of the logic insight thread to be stepped through on an expression-by-expression basis.

LIVM 210 may contain a taskflow analyzer 212. Taskflow analyzer 212 may assess whether an expression (from injected code) currently being executed in logic insight thread 180-1 does or does not correspond to a taskflow selected for debugging by the developer. If the expression is part of a selected taskflow, debugging functionality is provided to the developer via logic insight user interface 220. If the expression currently being executed in logic insight thread 180-1 does not correspond to a selected taskflow, taskflow analyzer 212 may cause LIVM 210 to cause execution of the expression to continue without debugging functionality being provided to the developer via logic insight user interface 220. As such, in some embodiments in which compiler 160 has compiled the logic insight injected code to have debugging functionality while being executed in a runtime mode, LIVM 210 only provides such debugging functionality to logic insight user interface 220 when expressions of a taskflow indicated or otherwise selected by the user for debugging is active.

During execution of logic insight thread 180-1, it may be possible for the developer to select and deselect one or more taskflows of the logic insight injected code for debugging, thus changing which expressions result in debugging functionality being provided to the developer. Such an arrangement may be possible if compiler 160 added and/or modified expressions in the injected code being compiled that allows for debugging functionality in all taskflows of the injected code. When a non-selected taskflow is being executed, LIVM 210 may automatically (without developer input) provide input to virtual machine 150 indicating that execution of logic insight thread 180-1 should proceed.

LIVM 210 may also serve to receive from logic insight thread 180 changes in variable values. These changes may be used to provide variable values to developer computer system 130-1 (e.g., for presentation to the developer) when a taskflow selected for debugging is being executed by virtual machine 150. Logic insight injected code runtime may have been compiled by compiler 160 such that each time a variable is created or modified, a value of the variable and an indication of the variable are output to LIVM 210. This value of the variable and the indication of the variable may be received by LIVM 210 and may be used to present an indication of the variable and the variable value to the developer via logic insight user interface 220 when a taskflow, as determined by taskflow analyzer 212, that has been selected by the user for debugging is having one or more of its expressions being executed. The developer may be permitted to modify one or more of the variable values via logic insight user interface 220. If an unselected taskflow is active, variable values may not be output by LIVM 210 to logic insight user interface 220 (however, LIVM 210 may still receive them from virtual machine 150, but may store, ignore, or discard the received values). LIVM 210 may indicate to the developer the current expression in the injected code of the logic insight thread currently being executed (or about to be executed) if the expression is part of a taskflow selected for debugging being executed (but not when an expression of an unselected taskflow is being executed by virtual machine 150).

From the point of view of LIVM 210, all taskflows executed by logic insight thread 180-1 may be configured to break after execution after lines of code and output variable values. However, taskflow analyzer 212 of LIVM 210 may determine when execution is to be caused to be continued by LIVM 210 and when debugging functionality is to be presented via logic insight user interface 220 based on indications of one or more selected task flows received via taskflow selection module 225 of logic insight user interface 220.

Logic insight user interface (LIUI) 220 may be used to receive injected code from a developer via developer computer system 130-1. LIUI 220 may permit the appropriate taskflow to be selected with which the code will be associated. LIUI 220 may be a web-based interface and may be implemented via a web browser. For example, LIUI 220 may be presented as part of a webpage through which a user is permitted to enter code directly (e.g., as text) and/or select a file that contains the business logic code for uploading (injection) to web service computer system 140 for compilation and, possibly, execution. LIUI 220 may permit the developer to indicate that the business logic code is desired to be compiled and executed for debugging (as logic insight injected code runtime). LIUI 220 may permit the user to perform debugging functions on at least the injected code while logic insight thread 180 is being executed. Thus, since such debugging occurs while logic insight thread 180 is executing, this is referred to as real-time debugging. Such debugging functions that LIUI 220 may be used to perform includes: setting breakpoints (and viewing the state of variable at such breakpoints), stepping through execution of the business logic code on an expression-by-expression basis, and/or viewing (and/or editing) of values of variables. Via a session with web service computer system 140, logic insight user interface 220 may be used to send input from the developer to control execution of logic insight thread 180 via LIVM 210 and to receive information about the execution of logic insight thread 180 to be output to LIUI 220 for presentation to the developer.

LIUI 220 may include a taskflow selection module 225. LIUI 220 may receive from LIVM 210 an indication of the various taskflows defined by the application being executed. Taskflow selection module 225 may permit a developer to select one or more taskflows that the developer desires to debug. Taskflow selection module 225 may permit a developer to indicate one or more taskflows that the developer does not desire to debug (such as by not selecting a taskflow). Indications of the taskflows selected for debugging by the developer may be provided to LIVM 210 such that debugging functionality (e.g., variable values, breaks in execution) is only provided to the developer for expressions that are part of the taskflows selected by the developer. LIVM 210 may cause execution to continue without debugging functionality for other taskflows. The developer, during execution of logic insight thread 180-1, may adjust which taskflows are selected via taskflow selection module 225. Such modifications to the selections of taskflows may be communicated to LIVM 210, which will in turn modify for which taskflows debugging functionality is presented to the developer via LIUI 220. For example, a developer may enable debugging of a particular taskflow then disable such debugging at a future time while the taskflow is running. Such selection and deselection affects for which taskflows debugging functionality is output by LIVM 210 to logic insight user interface 220. In some embodiments, taskflow selection module 225 is used to select one or more taskflows prior to execution of logic insight thread 180-1. In some embodiments, selections of taskflows may also be made during execution of logic insight thread 180-1.

Figure 3:
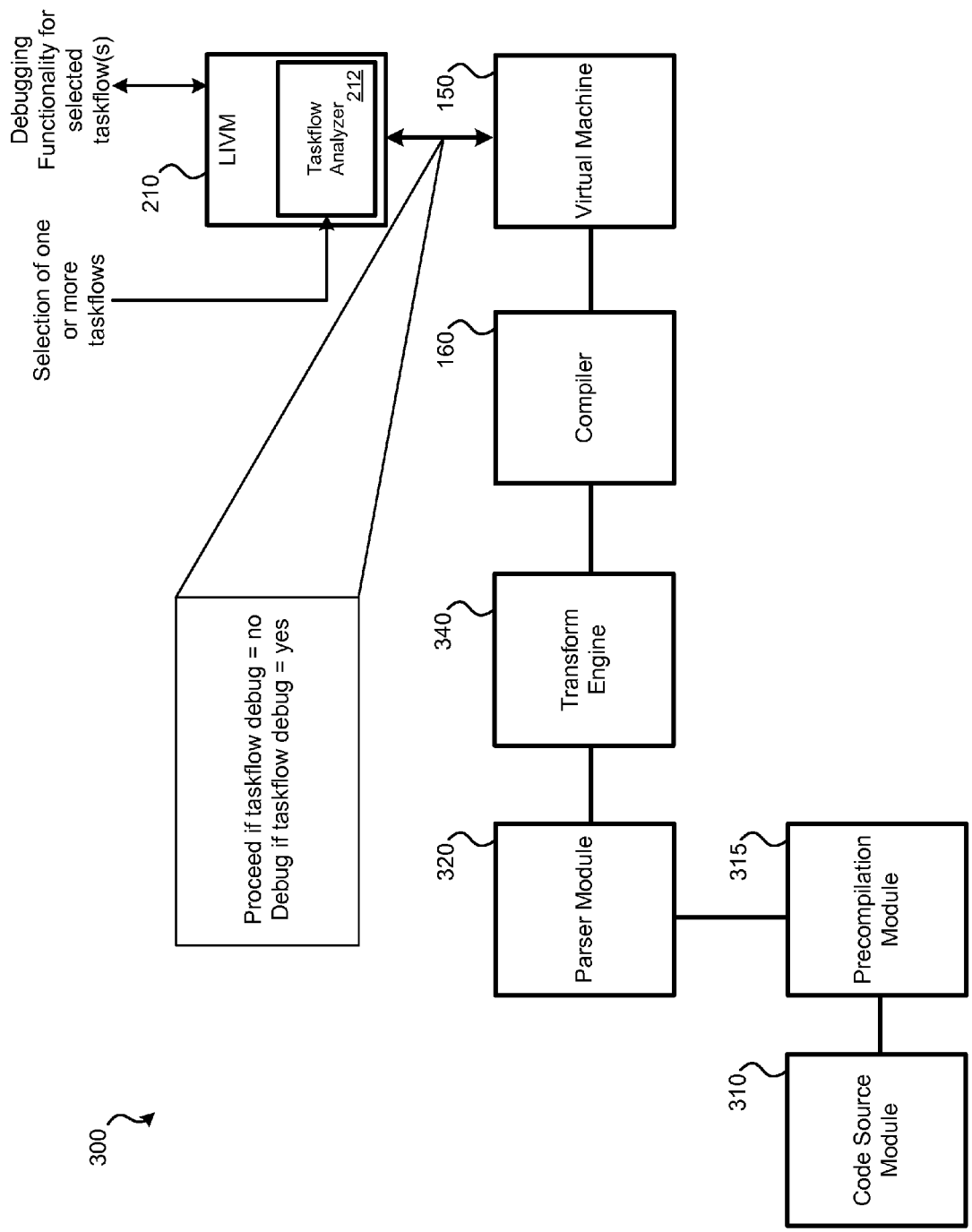
FIG. 3 illustrates a block diagram of an embodiment of a system configured for taskflow-targeted debugging.

FIG. 3 illustrates a block diagram of an embodiment of a system 300 configured for taskflow-targeted debugging. System 300 represents various hardware, firmware, and/or software modules that may be used to create logic insight injected code runtimes. Each of the illustrated modules, unless otherwise indicated, may be part of (or executed by) web service computer system 140 of systems 100 and 200 of FIGS. 1 and 2, respectively. Accordingly, in at least some embodiments, system 300 may be part of system 100 and/or system 200. System 300 comprises various modules, each of which may be implemented using software, firmware, and/or hardware. Components include: code source module 310, pre-compilation module 315, parser module 320, transform engine 340, compiler 160, virtual machine 150, and LIVM 210. It should be understood that such components may be divided into a greater number of components and/or combined into a fewer number of components.

Code source module 310 may serve to receive injected (business logic) code. This code may be written in a syntax of a programming language that, when compiled, may be edited at the syntax tree level. For instance, Java® may be used as the programming language for the business logic code. In some embodiments, code source module 310 may be configured to receive code from a remote computer system, such as code submitted via a web-based interface (e.g., LIUI 220 as presented in FIG. 2) from a user computer system or a developer computer system. Such received code may be referred to as "injected" code because it is received from a remote computer system for compilation and/or execution. Code source module 310 may serve to access a file containing code that is to be compiled. The injected code may be compiled and executed by a system that is simultaneously compiling and executing other injected code.

Pre-compilation module 315 may complete part of a compilation process of the business logic code received by code source module 310. In some embodiments, pre-compilation module 315 may insert one or more expressions in the business logic code received by code source module 310. Parser module 320 may parse the business logic code containing the expressions to create a syntax tree. The syntax tree created may be an abstract syntax tree. At this juncture, it may be possible in some programming languages to modify the syntax tree prior to bytecode being compiled as the logic insight injected code runtime.

Transform engine 340 may modify the syntax tree created by parser module 320. Transform engine 340 may add or modify some or all expressions of the expressions in the syntax tree. Whenever a variable value is initially set or modified, the syntax tree may be modified such that an indication of the variable and the variable value is output to LIVM 210. Accordingly, during execution, the LIVM 210 may maintain the current values of each variable present in the injected business logic code. Via a push or a pull, a LIUI of a developer may receive an indication of the set or modified variable and the associated value from LIVM 210. Expressions may be added such that after each expression present in the business logic code is executed, execution is halted (e.g., placed in a suspended or loop mode) until an instruction is received from LIVM 210 that indicates execution is to proceed to at least the next expression. An indication of the expression executed or about to be executed may be provided to LIVM 210. In turn, LIVM 210 may provide an indication to a developer's LIUI of what expression has just been executed or is about to be executed (thus allowing a user to monitor the flow of execution of the injected code).

In some embodiments, transform engine 340 modifies all of the injected code, regardless of which taskflows are selected, to permit debugging. In other embodiments, only portions of the injected code associated with the taskflows to be debugged are modified by transform engine 340. In such embodiments, the developer may be required to specify which one or more taskflows are desired to be debugged ahead of compilation. In embodiments where all taskflows are modified by transform engine 340, the developer can alter during execution for which taskflows debugging functionality is provided to the developer via LIUI 220.

Compiler 160 may compile the modified syntax tree into bytecode. This bytecode is referenced as a logic insight injected code runtime, which will be executed as a logic insight thread. The injected code received by code source module 310, as modified by pre-compilation module 315 and transform engine 340, may be compiled by compiler 160. This logic insight injected code runtime is configured to be executed by a virtual machine in a runtime mode.

Virtual machine 150, which is in communication with LIVM 210, may execute the bytecode compiled by compiler 160 as the logic insight injected code runtime. For each expression that was modified by transform engine 340, LIVM may be contacted to determine whether execution should continue. Therefore LIVM 210 monitors which taskflows are to have debugging functionality and at which expressions execution should be halted until developer input is received (e.g., at developer-set breakpoints and/or if the developer has requested execution on an expression-by-expression basis). LIVM 210 may also receive values of variables (such as each time such a variable value may be set or modified by virtual machine 150). LIVM 210 may also receive an indication of the current expression of business logic code executed or about to be executed. Such information may be received by LIVM 210. Input from a developer computer system may be requested by LIVM 210 before the bytecode is permitted to proceed and/or information may be output to the developer (such as variable values) via an LIUI by LIVM 210.

If the logic insight injected code runtime was compiled such that debugging functionality is present in all taskflows of the logic insight injected code, taskflow analyzer 212 may monitor to determine expressions of which taskflow of the logic insight thread are being executed to determine if debugging functionality should be made available to the developer. If the expression being executed by virtual machine 150 is not linked with a taskflow that the developer indicated as desired to be debugged, the taskflow analyzer 212 may cause LIVM 210 to indicate to virtual machine 150 that execution should continue. No debugging information may be provided to the developer for this expression. For instance, LIVM 210 may instruct virtual machine 150 to automatically continue execution and/or variable values may not be output to the developer computer system. However, when taskflow analyzer 212 detects that an expression of a taskflow that the developer indicated is to be debugged is being executed, debugging functionality may be enforced by LIVM 210 such that it is provided to LIUI 220. This may include enforcing breakpoints, outputting variable values to the developer computer system, and providing an indication of which expression is being executed. Within the logic insight thread, various taskflows may be identified. The taskflows may be identified by tags or other identifiers that were inserted by a developer into the code to group code into logical code grouping, such as a logical code grouping related to the performance of a particular task.

Figure 4:
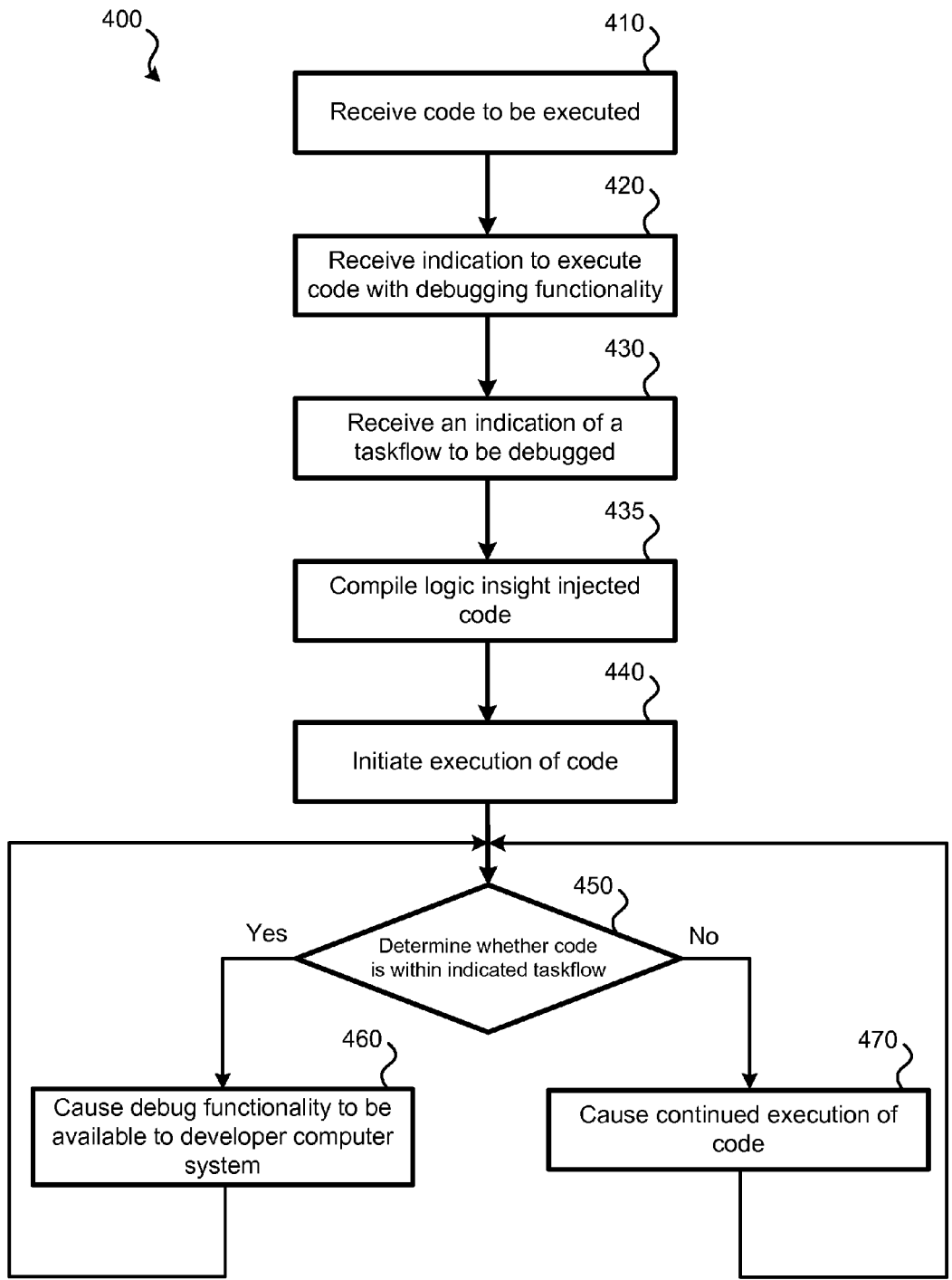
FIG. 4 illustrates an embodiment of a method for taskflow-targeted debugging.

Systems 100 through 300 of FIGS. 1 through 3 may be used to perform various methods. FIG. 4 illustrates an embodiment of a method 400 for taskflow-specific debugging. Method 400 may be performed by system 100, system 200, and/or system 300 of FIGS. 1-3, respectively. Method 400 may also be performed by some other form of system for executing runtime threads and compiling and executing logic insight injected codes. One or more computer systems, such as a web server, may be used to perform method 400. Means for performing method 400 include one or more computer systems and networks. Each step of method 400 may be performed using a computer system, which may include one or more individual computers that are in communication with each other, such as one or more web servers. Referring to FIGS. 2 and 3, each step of method 400 may be performed by web service computer system 140.

At step 410, injected code may be received by the computer system for compilation into logic insight injected code runtime and execution as a logic insight thread. This code may be injected via a web browser interface being provided to a developer via a developer computer system and a network connection, such as illustrated in relation to FIGS. 1 and 2. While step 410 is in progress and the rest of method 400 is being performed, the computer system may be executing various runtime threads, such as injected-code runtimes.

The computer system may execute runtime threads for one or more users during method 400. Referring to FIG. 1, web service computer system 140 may execute runtime threads for users remotely accessing web service computer system 140 via network 120-1, which may be the Internet. The runtime threads may be based on other injected code provided for compiling and/or execution to the web service computer system. Any runtime threads being executed may be executed by a virtual machine of the web service computer system. Each runtime thread may be associated with a particular user's HTTP session with the web service computer system. Each of these runtime threads may be executed without debugging functionality. The virtual machine of the web service computer system that is executing the runtime threads may be executing these threads in a runtime mode.

At step 420, the developer may provide an indication to a developer computer system that the injected code is to be executed with debugging functionality. From the point-of-view of the developer, this may be considered a debugging mode, even though the logic insight injected code runtime will be executed by the virtual machine in a runtime mode. At step 420, this indication may be received by the web service computer system performing method 400. At step 430, the developer may provide an indication of one or more taskflows to be debugged. Previously, the developer may have selected and associated the injected code with the appropriate taskflow. In instances where taskflows are predefined and not editable by the developer, such taskflows may have one or more predefined hook points that allow for injected code to be called. Such input may be provided by the user selecting from a list of taskflows that are to be executed. Alternatively, the developer may provide the names of one or more taskflows that are desired to be debugged. Additionally or alternatively, one or more taskflows for debugging may be selected (or deselected) after the compilation of step 435. By indicating one or more taskflows for debugging, execution of other taskflows present within the injected code may not result in debugging functionality being presented to the developer. The web browser-based interface may provide to the developer, via a network connection and a developer computer system, a selection of the various taskflows determined to be present within the application. While the developer may select one or more taskflows, for the remainder of this embodiment, it is assumed the developer specified a single taskflow for debugging. At step 430, the web service computer system may receive an indication of the taskflow selected by the developer.

At step 435, the injected business logic code that was injected may be compiled into logic insight injected code runtime. Compiling may be performed by a compiler such as compiler 160 of FIG. 2. The compiling process may be altered from a normal compile because debugging functionality is desired. As such, debugging functionality may be added to the business logic code at the syntax tree level, as detailed in relation to FIG. 3, and compiled into logic insight injected code runtime. Compiling of the injected code at step 435 may occur at the same time as one or more runtime threads are being compiled and/or executed by the virtual machine of the web service computer system. Logic insight injected code runtime may have debugging functionality, but may not require a virtual machine to execute in a debugging mode for such functionality to be realized. The debugging functionality may include one or more of the following: the ability of a developer to select one or more breakpoints within the business logic code at which execution of the logic insight injected code runtime will be halted, the ability to step through execution of the injected business logic code provided by the developer on an expression-by-expression basis (in real time); the ability to view (and/or modify) variable values present in expressions of the business logic code during execution (in real time); the ability to receive an indication when an expression begins execution, and/or the ability to receive an indication when an expression completes execution. Other debugging functionality may also be possible. In some embodiments, the logic insight injected code runtime is compiled such that debugging functionality is inserted in all taskflows of the compiled code. In other embodiments, the logic insight injected code runtime is compiled such that debugging functionality is only available in taskflows specifically selected by the developer.

At step 440, the logic insight injected code runtime may be executed by the virtual machine of the webserver as a logic insight thread. As such, execution occurs remote from the developer computer system from where the injected code may have been received. The execution of the logic insight thread may occur concurrently with the execution of one or more runtime threads. The virtual machine may execute the logic insight thread (and any other runtime threads being executed) in the virtual machine's runtime mode. As such, the virtual machine executes all threads as runtimes and no threads in a debugging mode. However, the logic insight thread has debugging functionality because the code of the logic insight thread was modified during compilation. While the logic insight thread behaves as a runtime for the virtual machine, the modifications during compilation provides a developer with functionality typically associated with the virtual machine being operated in a debugging mode. The debugging functionality present in the logic insight injected code runtime may include: the ability of a developer to set one or more breakpoints within the business logic code (and view the code and variable values when the breakpoints are reached during execution); the ability to step through the injected code provided by the developer during execution on an expression-by-expression basis (in real time execution); the ability to view (and/or modify) variable values present in expressions of the business logic code during execution (in real time execution); the ability to receive an indication when an expression begins execution; and/or the ability to receive an indication when an expression completes execution.

The execution of the logic insight thread may not affect execution of any of the runtime threads that happen to be executing (except in the regard that it consumes memory, processing, and network resources). More specifically, the debugging functionality, such as allowing the developer to set breakpoints or allowing business logic injected code associated with the logic insight thread to be executed on an expression-by-expression basis does not require that such debugging functionality be present in the runtime threads. Similarly, the execution of the runtime threads does not affect execution of the logic insight thread (except in the regard that it consumes memory, processing, and network resources). While method 400 only considers a single logic insight injected code runtime being compiled and executed as a thread by the virtual machine operating in a runtime mode, multiple logic insight injected codes may be compiled and/or executed as threads are by the same virtual machine of the same web service computer system.

At step 450, while the code is being executed, each expression executed by the virtual machine may be checked (by a logic insight virtual machine) to determine if it is associated with the taskflow indicated by the developer as desired for debugging at step 430. If so, for that expression, step 460 is performed. At step 460, debugging functionality is made available to the developer computer system. This may involve waiting for input that permits the next expression to be executed, outputting variable values to the developer computer system, enforcing any breakpoints associated with the expression previously set by the developer (which may be stored by logic insight virtual machine), providing an indication of the expression being (or about to be) executed, and/or receiving input to be used as a variable value.

If, at step 450, it is determined that the expression is associated with a taskflow that is not desired to be debugged, step 470 is performed. At step 470, no debugging functionality is made available to the developer computer system. This may involve: not waiting for input that permits the next line of code to be executed (continuing execution without waiting for developer input), not outputting variable values to the developer computer system, not enforcing breakpoints, not providing an indication of the expression being (or about to be) executed, and/or not receiving or processing input to be used as variable values. Step 470 may involve a logic insight virtual machine automatically providing input to the virtual machine executing the logic insight thread indicating that execution is to continue. As execution continues, for each expression, step 450 may be evaluated to determine whether or not the expression is part of the taskflow indicated by the developer as desired to be debugged.

During such execution, the developer may be permitted to revise which one or more taskflows are to be debugged. Such modification of the taskflows selected for debugging may alter the determination made at step 450. For example, while a particular taskflow is being executed, the developer may toggle whether debugging functionality for that taskflow is enabled or disabled. Such a toggle could alter the outcome of step 450 for the next expression evaluated. The developer may be permitted to perform such a toggle as many times as necessary to serve the developer's debugging goals.

During execution of the logic insight injected code runtime as the logic insight thread in a taskflow indicated by the developer to be debugged, execution of the thread may pause or enter a loop mode until a LIVM indicates to the virtual machine that execution is permitted to continue. The LIVM may permit execution to continue for each expression unless a point is reached where the developer has specified a breakpoint for that expression. If a breakpoint is present, execution may be suspended until the developer provides input permitting continued execution via a LIUI to the LIVM. At a breakpoint, an indication of variable values and what expression is to be executed may be output to the LIUI via the LIVM. In some embodiments, execution may halt after each expression in a selected taskflow until the developer indicates execution is to continue via the LIUI to the LIVM.

Figure 5:
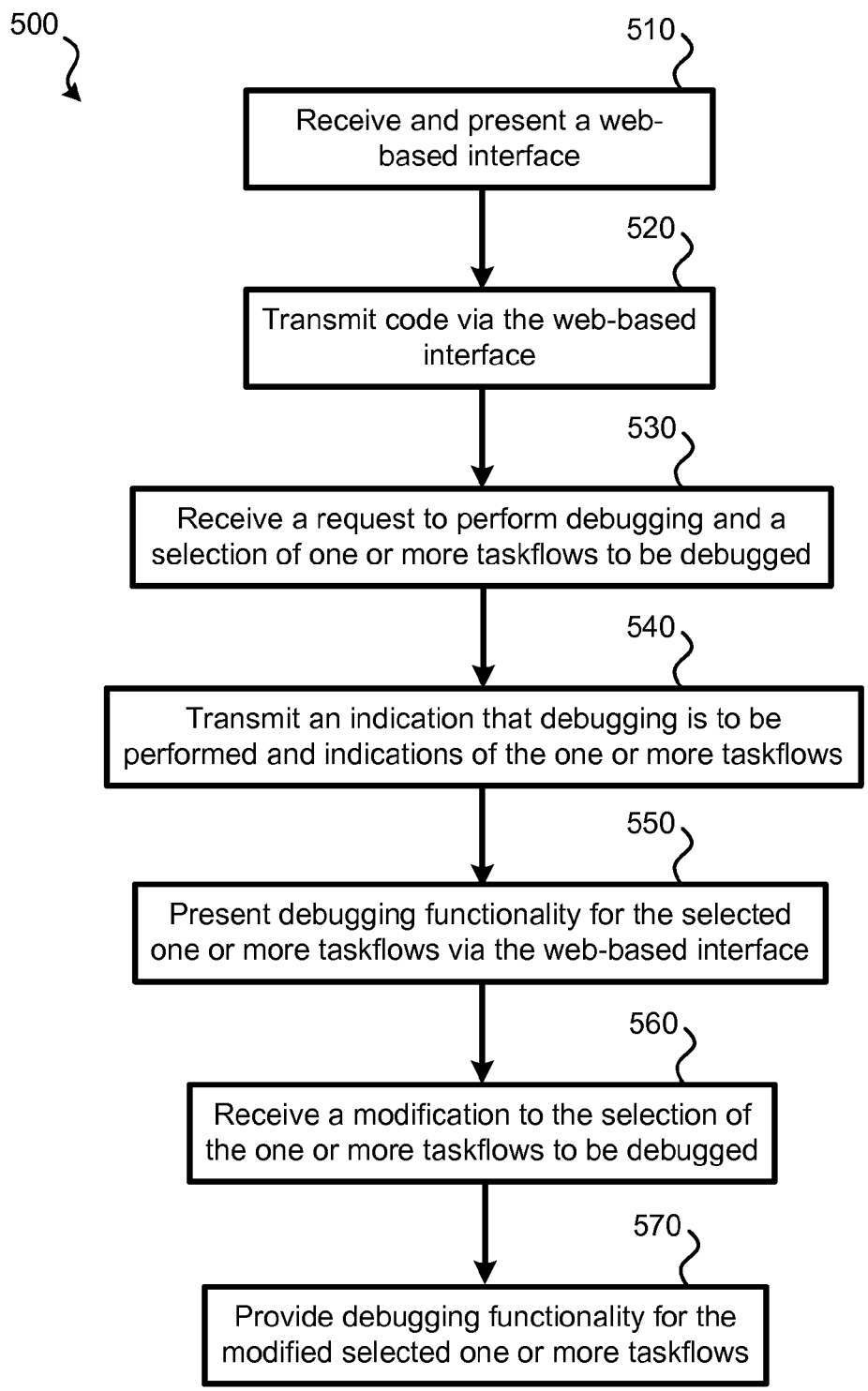
FIG. 5 illustrates another embodiment of a method for taskflow-targeted debugging.

FIG. 5 illustrates another embodiment of a method for taskflow-targeted debugging. Method 500 may be performed by system 100, and/or system 200 of FIGS. 1 and 2, respectively. Method 500 may also be performed by some other form of system that allows a developer to interact with a remote web service computer system that is compiling and executing injected code. One or more computer systems, such as a developer computer, may be used to perform method 500. Means for performing method 500 include one or more computer systems and networks. Each step of method 500 may be performed using a computer system, which may include one or more individual computers that are in communication with each other. Referring to FIGS. 1 and 2, each step of method 500 may be performed by a developer computer system of developer computer systems 130. Steps of method 500 may be performed by the developer computer system while method 400 is performed by a web service computer system.

At step 510, a web-based interface may be presented to a developer by the developer computer system. The web-based interface may be received from the web service computer system, which may be performing method 400. The web-based interface allows the developer to provide code to be injected to the web service computer system for compilation and execution. The code may be typed directly into a code editor of the web-based interface or one or more files of pre-written code may be selected for uploading to the web service computer system via the web-based interface. At step 520, the code may be transmitted via the web-based interface and one or more networks to the web service computer system. The code being transmitted to the web service computer system may correspond to step 410 of method 400.

At step 530, the web-based interface may present the developer with selections of taskflows during which the code transmitted at step 520 is to be executed. The web-based interface may also have an option for the developer to select whether the injected code provided by the developer is to be compiled for debugging or not. At step 530, via the web-based interface, the developer may specify that the injected code is to be debugged and the developer may specify one or more taskflows in which the injected code is executed to be debugged. (For the purposes of this example, it is assumed a single, first taskflow was indicated for debugging and a second taskflow was not selected for debugging.) In some embodiments, the user may select which taskflows are to be debugged at a later time in method 500. Additionally at step 530, the developer may be presented with the injected code and may be permitted to specify one or more breakpoints and/or indicate whether execution of the taskflows to be debugged should be executed until a breakpoint or error occurs or should be executed on an expression-by-expression basis. At step 540, the indication that the injected code is to be debugged and the taskflow to be debugged is transmitted to the web service computer system.

Following step 540, various steps of method 400 may be performed by the web service computer system, such as steps 420 through 470. Therefore, the web service computer system may create a logic insight injected code runtime and may execute the logic insight injected code runtime as a logic insight thread (the logic insight thread being executed by a virtual machine of the web service computer system in a runtime mode).

At step 550, debugging functionality may be presented by the developer computer system for the taskflow selected for debugging by the developer. Debugging functionality may only be provided for the portions of the taskflow that correspond to compiled injected code. The debugging functionality may only be presented once the taskflow selected for debugging begins execution (or a breakpoint within the selected taskflow is reached). For other taskflows that are not selected, the logic insight thread may execute, at least from the developer's point of view, as a runtime thread. The debugging functionality may be presented by a LIUI in a web browser as part of the web-based interface. The debugging functionality may include the developer being presented indications of variables and associated variable values (and, possibly, the opportunity to modify such variable values) and an indication of the expression within the injected code being executed (or about to be executed or just-previously executed). The debugging functionality may further include an option for execution to continue for a single expression (to allow stepping through the execution of the logic insight thread). Another option may be present to allow execution to continue until a breakpoint or error occurs. During execution, the web service computer system may be performing steps 450 through 470—executing the injected code runtime and providing debugging functionality for selected taskflows. During other taskflows, the LIVM may be instructing the virtual machine to continue execution automatically (without developer input).

During execution of the logic insight thread, the developer may modify the selection of the taskflow selected to be debugged. Additional, fewer, or different taskflows may be selected for debugging via the web-interface presented to the developer. Such a modification in the taskflow to be debugged may be passed to the web-service computer system. Referring to FIG. 2, taskflow analyzer 212, after receiving the updated taskflows to be executed (during execution), may cause LIVM to provide the debugging functionality to the developer for the now-selected taskflows. At step 570, debugging functionality is provided to the developer via the developer computer system and the web-based interface for the modified selected one or more taskflows. The developer may continue to modify which taskflows are to be debugged as the logic insight thread is executed by the web service computer system.

It should be understood that while method 500 is being performed, one or more other logic insight threads (based on the same or different logic insight injected code runtimes) and one or more injected code runtimes may be executed for one or more other developers and/or users by the virtual machine of the web service computer system at the same time. Therefore, the web service computer system may be providing compilation, execution (with or without debugging functionality) for multiple developers/users at the same time with the virtual machine of the web service computer system functioning in a runtime mode.

Figure 6:
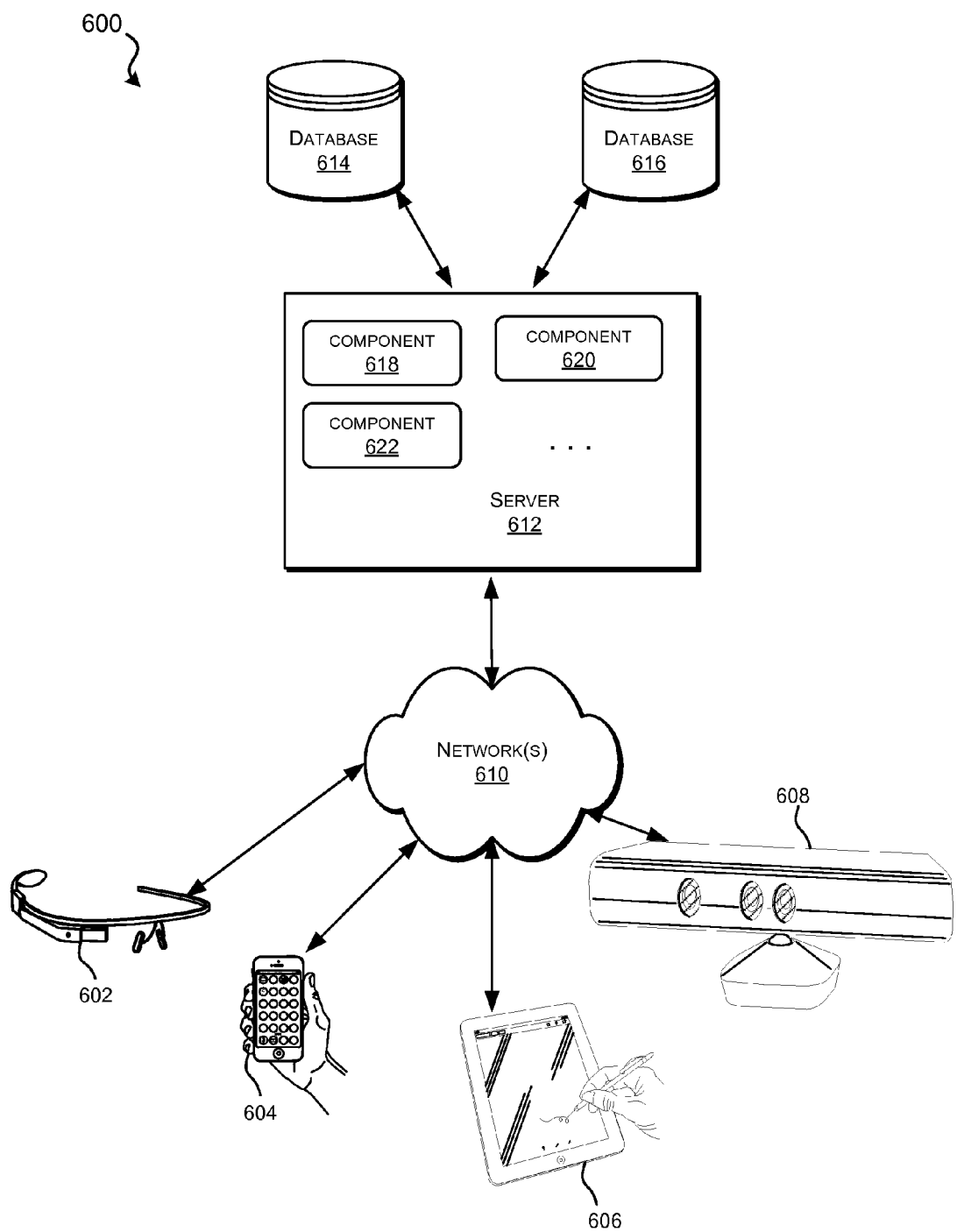
FIG. 6 illustrates an embodiment of a distributed system that permits the use of a remote developer computer system.
Figure 7:
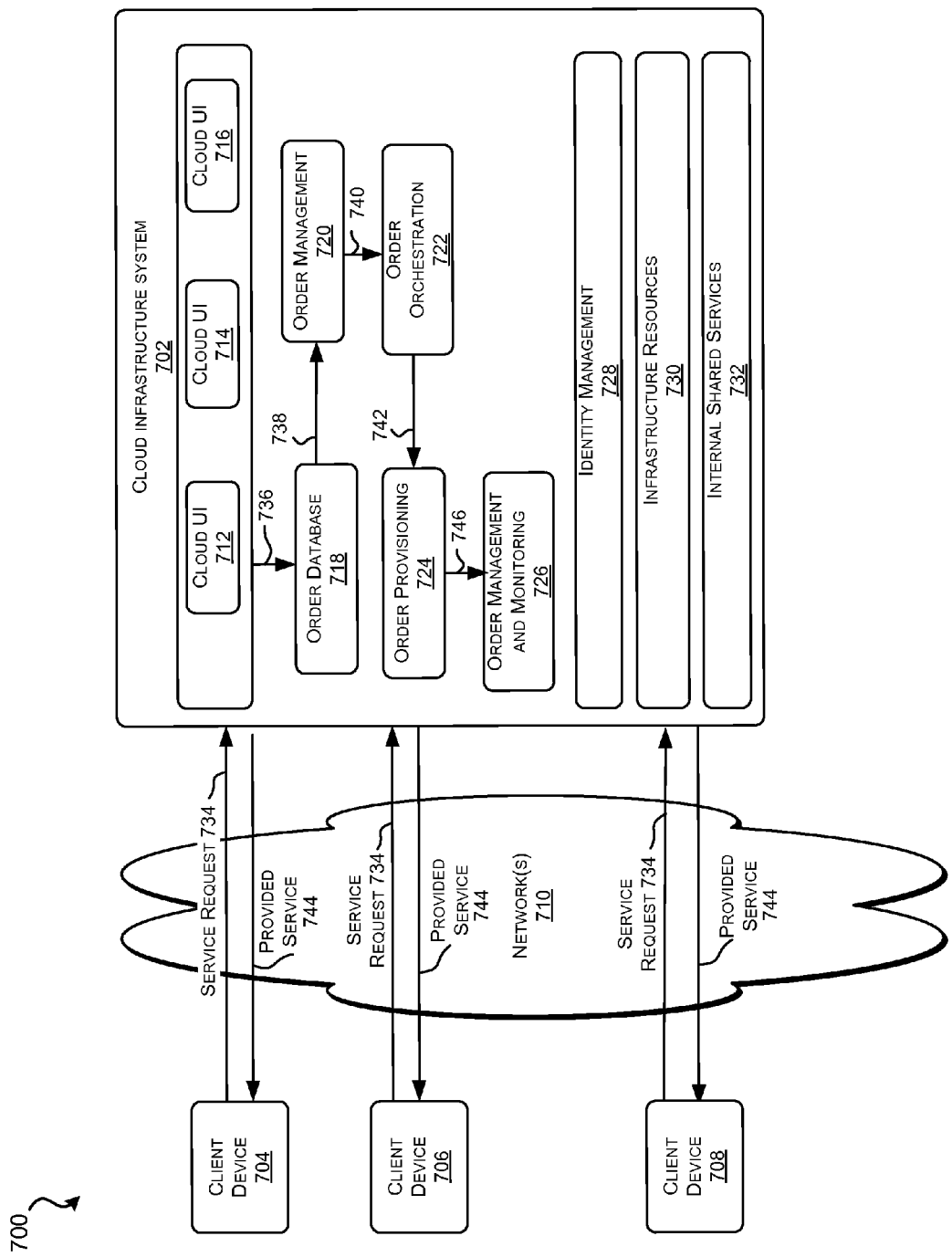
FIG. 7 illustrates a block diagram of an embodiment of a system environment by which services may be offered as cloud services.
Figure 8:
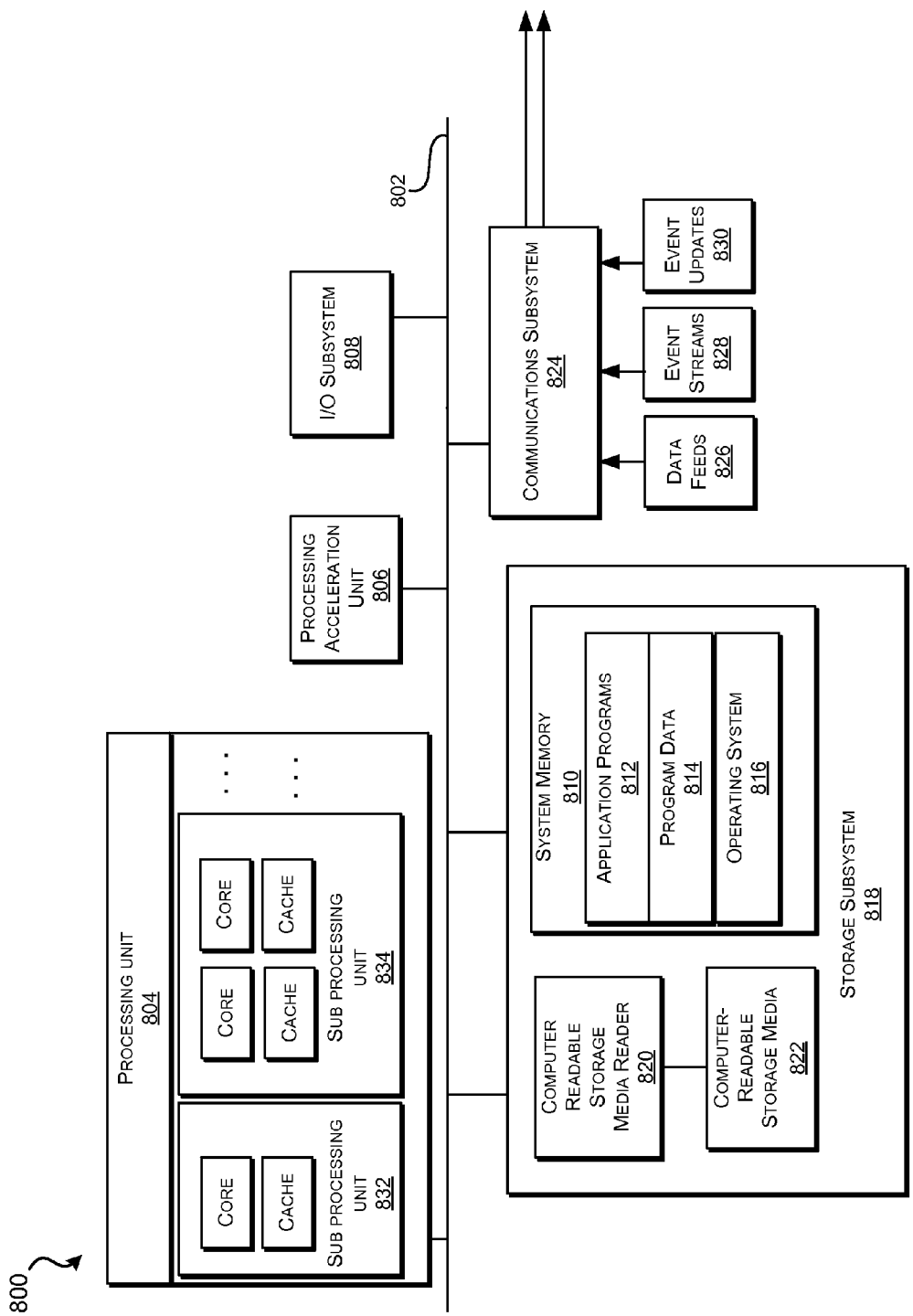
FIG. 8 illustrates an embodiment of a computer system, which may be used to implement various embodiments detailed herein.

FIGS. 6-8 provide additional details on how a distributed system may be implemented that allows user and developers to remotely interact with a web service computer system. FIG. 6 illustrates an embodiment of a distributed system 600 that permits the use of a remote developer computer system. In the illustrated embodiment, distributed system 600 includes one or more client computing devices 602, 604, 606, and 608 (which may represent user and/or developer computer systems), which are configured to execute and operate a client application such as a web browser, proprietary client (e.g., Oracle® Forms), or the like over one or more network(s) 610. Server 612 (which may be the web service computer system) may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users/developers operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle®, that are adapted to store, update, and retrieve data in response to SQL-formatted commands.

FIG. 7 illustrates a block diagram of an embodiment of a system environment by which services may be offered as cloud services. In the illustrated embodiment, system environment 700 includes one or more client computing devices 704, 706, and 708 (which can include user computer systems and/or developer computer systems) that may be used by users to interact with a cloud infrastructure system 702 (e.g., the web service computer system) that provides cloud services. The client computing devices may be configured to operate a client application such as a web browser, a proprietary client application (e.g., Oracle® Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608. Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612. In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like (in addition to the compilation, execution, and debugging functionality previously described). Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle® Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle®) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle® Java Cloud Service (JCS), Oracle® Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. For example, such an arrangement may be used by a customer/developer in order to have the web service computer system perform compilation and execution of the developer's code to be injected. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to. After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements. At operation 738, the order information is forwarded to an order management module 720. In some instances, order management module 720 may be configured to perform billing and accounting functions related to the order, such as verifying the order, and upon verification, booking the order. At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702. At operation 746, the customer's subscription order may be managed and tracked by an order management and monitoring module 726. In some instances, order management and monitoring module 726 may be configured to collect usage statistics for the services in the subscription order, such as the amount of storage used, the amount of data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.). Identity management module 728 may also include the management of descriptive information about each customer and about how and by whom that descriptive information can be accessed and modified.

FIG. 8 illustrates an embodiment of a computer system 800, which may be used to implement various embodiments detailed herein, such as the web service computer system, developer computer systems, and user computer systems. It should be understood that the previously described computer systems may include one or more instances of a computer such as computer system 800. For instance, a group of servers may perform the functions of a web service computer system. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 818 may also include a computer-readable storage media reader 820 that can be further connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 800.

By way of example, computer-readable storage media 822 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for debugging code, the method comprising:
   compiling, by a computer system, code into compiled code, wherein a first portion of the code corresponds to a first taskflow;
   receiving, by the computer system, a selection of the first taskflow from a developer computer system via a network, wherein the selection indicates the first taskflow is to be debugged;
   commencing execution, by the computer system, of the first taskflow; and
   while the computer system is executing the first taskflow of the compiled code, providing, by the computer system, to the developer computer system via the network, debugging functionality for the first portion of the code, wherein the debugging functionality comprises one or more features selected from the group consisting of:
   halting execution of the first taskflow at a breakpoint defined within the first portion of the code at the developer computer system,
   outputting a variable value from within the first portion of the code to the developer computer system during execution of the first taskflow, and
   receiving input from the developer computer system that triggers processing of individual expressions in the first portion of the code to occur.

2. The method for debugging code of claim 1, the method further comprising:
   prior to compiling the code, receiving, by the computer system, the code for compiling from the developer computer system via a web browser interface and the network, wherein the computer system is a web service computer system that provides compiling services for multiple developer computer systems.

3. The method for debugging code of claim 1, further comprising:
   executing, by the computer system, a second taskflow that corresponds to a second portion of the code, wherein:
   selection for debugging of the second taskflow from the developer computer system via the network is not received; and
   debugging functionality associated with the second portion of the code is not provided to the developer computer system.

4. The method for debugging code of claim 1, further comprising:
   providing, by the computer system, an interface, via a web browser, to the developer computer system, that permits selection among a plurality of taskflows, the plurality of taskflows comprising the first taskflow and a second taskflow that corresponds to a second portion of the code.

5. The method for debugging code of claim 4, further comprising:
   receiving, by the computer system, from the developer computer system, during execution of the first taskflow, a selection of the second taskflow;
   commencing execution, by the computer system, of the second taskflow; and
   while the computer system is executing the second taskflow of the compiled code, providing, by the computer system, to the developer computer system via the network, debugging functionality for the second portion of the code.

6. The method for debugging code of claim 1, wherein execution, by the computer system, of the first taskflow is performed by a virtual machine executed by the computer system, the virtual machine executing the compiled code as a runtime thread.

7. The method for debugging code of claim 6, further comprising:
   while executing the first taskflow, executing, by the virtual machine executed by the computer system, a second runtime thread, wherein the second runtime thread does not have debugging functionality provided to any user.

8. The method for debugging code of claim 1, wherein compiling the code into the compiled code comprises:
   modifying the first portion of the code and a second portion of the code that corresponds to a second taskflow during compilation to include additional code, wherein the additional code provides for debugging functionality.

9. A system for debugging code, the system comprising: a web service computer system, comprising:
   one or more processors; and
   a memory communicatively coupled with and readable by the one or more processors and having stored therein processor-readable instructions which, when executed by the one or more processors, cause the one or more processors to:
   compile code into compiled code, wherein a first portion of the code corresponds to a first taskflow;
   receive a selection of the first taskflow from a developer computer system via a network, wherein the selection indicates the first taskflow is to be debugged;
   commence execution of the first taskflow; and
   while the web service computer system is executing the first taskflow of the compiled code, provide, to the developer computer system via the network, debugging functionality for the first portion of the code, wherein the debugging functionality comprises one or more features selected from the group consisting of:
   a halt of execution of the first taskflow at a breakpoint within the first portion of the code as defined at the developer computer system, an output of a variable value from within the first portion of the code to the developer computer system during execution of the first taskflow, and an ability to provide input from the developer computer system that triggers processing of individual expressions in the first portion of the code to occur.

10. The system for debugging code of claim 9, wherein the processor-readable instructions, when executed, further cause the one or more processors to:
    prior to compiling the code, receive the code for compiling from the developer computer system via a web browser interface and the network.

11. The system for debugging code of claim 9, wherein the processor-readable instructions, when executed, further cause the one or more processors to:
    execute a second taskflow, wherein:
    the second taskflow corresponds to a second portion of the code;
    selection for debugging of the second taskflow from the developer computer system via the network is not received; and
    debugging functionality associated with the second portion of the code is not provided to the developer computer system.

12. The system for debugging code of claim 9, wherein the processor-readable instructions, when executed, further cause the one or more processors to:

provide, an interface, via a web browser, to the developer computer system, that permits selection among a plurality of taskflows, the plurality of taskflows comprising the first taskflow and a second taskflow that corresponds to a second portion of the code.

13. The system for debugging code of claim 12, wherein the processor-readable instructions, when executed, further cause the one or more processors to:
receive, from the developer computer system, during execution of the first taskflow, a selection of the second taskflow;
commence execution of the second taskflow; and
while the computer system is executing the second taskflow of the compiled code, provide, to the developer computer system via the network, debugging functionality for the second portion of the code.

14. The system for debugging code of claim 9, wherein execution of the first taskflow is performed by a virtual machine executed by the computer system, the virtual machine executing the compiled code as a runtime thread.

15. The system for debugging code of claim 14, wherein the processor-readable instructions, when executed, further cause the one or more processors to:
while executing the first taskflow, execute, by the virtual machine, a second runtime thread, wherein the second runtime thread does not have debugging functionality provided to any user.

16. The system for debugging code of claim 9, wherein the processor-readable instructions that, when executed, cause the one or more processors to compile the code into the compiled code comprise processor-readable instructions which, when executed, cause the one or more processors to:
modify the first portion of the code and a second portion of the code during compilation to include additional code, wherein the additional code provides for debugging functionality and the second portion of code corresponds to a second taskflow.

17. A non-transitory processor-readable medium for debugging code, comprising processor-readable instructions configured to cause one or more processors to:
compile code into compiled code, wherein a first portion of the code corresponds to a first taskflow;
receive a selection of the first taskflow from a developer computer system via a network, wherein the selection indicates the first taskflow is to be debugged; commence execution of the first taskflow; and
while executing the first taskflow of the compiled code, provide, to the developer computer system via the network, debugging functionality for the first portion of the code–wherein the debugging functionality comprises one or more features selected from the group consisting of:
a halt of execution of the first taskflow at a breakpoint within the first portion of the code, the breakpoint defined at the developer computer system, an output of a variable value from within the first portion of the code to the developer computer system during execution of the first taskflow, and an ability to provide input from the developer computer system that triggers processing of individual expressions in the first portion of the code to occur.

18. The non-transitory processor-readable medium for debugging code of claim 17, wherein the processor-readable instructions are further configured to cause the one or more processors to:
prior to compiling the code, receive the code for compiling from the developer computer system via a web browser interface and the network, wherein the computer system is a web service computer system that provides compiling services for multiple developer computer systems.

* * * * *